(12) United States Patent
Solomon et al.

(10) Patent No.: US 11,857,957 B2
(45) Date of Patent: Jan. 2, 2024

(54) FLUIDIC DEVICES WITH REACTION WELLS AND USES THEREOF

(71) Applicant: Unchained Labs, Pleasanton, CA (US)

(72) Inventors: Deepak Solomon, Pleasanton, CA (US); Connor Sullivan, Pleasanton, CA (US)

(73) Assignee: Unchained Labs, Pleasanton, CA (US)

( * ) Notice: Subject to any disclaimer, the term of this patent is extended or adjusted under 35 U.S.C. 154(b) by 450 days.

(21) Appl. No.: 16/664,106

(22) Filed: Oct. 25, 2019

(65) Prior Publication Data

US 2020/0055051 A1 Feb. 20, 2020

Related U.S. Application Data

(63) Continuation of application No. PCT/US2018/029692, filed on Apr. 27, 2018.

(60) Provisional application No. 62/491,961, filed on Apr. 28, 2017.

(51) Int. Cl.
*B01L 3/00* (2006.01)

(52) U.S. Cl.
CPC .. *B01L 3/502738* (2013.01); *B01L 2200/0642* (2013.01); *B01L 2300/087* (2013.01); *B01L 2400/0688* (2013.01)

(58) Field of Classification Search
CPC ............ B01L 2400/0688; B01L 2300/087
USPC .................................................... 422/82, 503
See application file for complete search history.

(56) References Cited

U.S. PATENT DOCUMENTS

| | | | |
|---|---|---|---|
| 723,826 | A | 3/1903 | Buysse |
| 5,932,418 | A | 8/1999 | Yager |
| 6,048,734 | A | 4/2000 | Burns et al. |
| 6,293,012 | B1 | 9/2001 | Moles |
| 6,319,469 | B1 | 11/2001 | Mian et al. |
| 7,708,949 | B2 | 5/2010 | Stone et al. |
| 8,592,221 | B2 | 11/2013 | Fraden et al. |
| 8,765,485 | B2 | 7/2014 | Link et al. |
| 9,315,768 | B2 | 4/2016 | Vrouwe et al. |
| 10,875,017 | B2 | 12/2020 | Solomon et al. |

(Continued)

FOREIGN PATENT DOCUMENTS

| | | |
|---|---|---|
| AU | 2013204820 B2 | 1/2014 |
| CA | 2521862 A1 | 10/2004 |

(Continued)

OTHER PUBLICATIONS

International Application No. PCT/US2018/029692, International Search Report dated Jul. 12, 2018, 4 pages.

(Continued)

*Primary Examiner* — Natalia Levkovich

(74) *Attorney, Agent, or Firm* — COOLEY LLP

(57) ABSTRACT

The present disclosure provides fluidic devices that in some embodiments have passive air control valves and in some instances, high resistance air valve constriction channels, or channel dimensions and compositions that provide effective capillary pressure ratios, that can be used to fill reaction wells and/or manipulate fluids in reaction wells. Also provided are fluidic systems containing fluidic devices adjoined to one another, methods for operating the fluidic devices, and methods for manipulating fluids using the fluidic devices. Methods for use of the fluidic devices in performing immunoassays, nucleic acid detection, other assay systems, including but not limited to point of care applications are also provided.

14 Claims, 15 Drawing Sheets

(56) References Cited

U.S. PATENT DOCUMENTS

| | | | |
|---|---|---|---|
| 10,981,166 | B2 | 4/2021 | Solomon |
| 11,305,279 | B2 | 4/2022 | Solomon |
| 2002/0033193 | A1 | 3/2002 | Mcneely et al. |
| 2002/0036018 | A1 | 3/2002 | Mcneely et al. |
| 2002/0075363 | A1 | 6/2002 | Mcneely et al. |
| 2002/0097633 | A1 | 7/2002 | O'Connor |
| 2003/0138829 | A1 | 7/2003 | Unger et al. |
| 2003/0159999 | A1 | 8/2003 | Oakey et al. |
| 2004/0072278 | A1 | 4/2004 | Chou et al. |
| 2004/0137607 | A1 | 7/2004 | Tanaami et al. |
| 2004/0206408 | A1 | 10/2004 | Peters et al. |
| 2006/0018790 | A1 | 1/2006 | Naka et al. |
| 2007/0037199 | A1 | 2/2007 | Takahashi et al. |
| 2007/0110631 | A1 | 5/2007 | Ajdari |
| 2007/0125942 | A1 | 6/2007 | Kido |
| 2007/0195127 | A1 | 8/2007 | Ahn et al. |
| 2008/0233607 | A1 | 9/2008 | Yu et al. |
| 2009/0136982 | A1 | 5/2009 | Tang et al. |
| 2009/0151792 | A1 | 6/2009 | Noda |
| 2010/0165784 | A1 | 7/2010 | Jovanovich et al. |
| 2010/0221831 | A1 | 9/2010 | Miyazaki et al. |
| 2010/0252118 | A1 | 10/2010 | Fraden et al. |
| 2011/0256574 | A1 | 10/2011 | Zhang et al. |
| 2011/0269226 | A1 | 11/2011 | Van Noort et al. |
| 2011/0301058 | A1 | 12/2011 | Cheng et al. |
| 2012/0219947 | A1 | 8/2012 | Yurkovetsky |
| 2012/0244043 | A1 | 9/2012 | Leblanc et al. |
| 2013/0136694 | A1 | 5/2013 | Russo Da Conceição Martinho et al. |
| 2013/0236376 | A1 | 9/2013 | Augstein et al. |
| 2013/0280131 | A1 | 10/2013 | Handique et al. |
| 2013/0337578 | A1 | 12/2013 | Delamarche et al. |
| 2014/0051062 | A1 | 2/2014 | Vanapalli et al. |
| 2014/0246098 | A1 | 9/2014 | Fraden et al. |
| 2014/0302160 | A1 | 10/2014 | Achrol et al. |
| 2014/0377850 | A1 | 12/2014 | Handique et al. |
| 2015/0044688 | A1 | 2/2015 | Richter et al. |
| 2015/0125947 | A1 | 5/2015 | Korczyk et al. |
| 2015/0184127 | A1 | 7/2015 | White et al. |
| 2015/0276562 | A1 | 10/2015 | Fraden et al. |
| 2016/0214104 | A1 | 7/2016 | Schwemmer et al. |
| 2016/0332163 | A1 | 11/2016 | Wang et al. |
| 2016/0361715 | A1 | 12/2016 | Shi et al. |
| 2016/0361716 | A1 | 12/2016 | Solomon |
| 2017/0232440 | A1 | 8/2017 | Ismagilov et al. |
| 2018/0071735 | A1 | 3/2018 | Linder et al. |
| 2019/0054467 | A1 | 2/2019 | Handique |
| 2020/0179930 | A1 | 6/2020 | Solomon |
| 2020/0261910 | A1 | 8/2020 | Solomon |
| 2021/0114022 | A1 | 4/2021 | Solomon et al. |
| 2022/0266212 | A1 | 8/2022 | Solomon |
| 2023/0145727 | A1 | 5/2023 | Solomon |

FOREIGN PATENT DOCUMENTS

| | | |
|---|---|---|
| EP | 2364774 A2 | 9/2011 |
| FR | 2897282 A1 | 8/2007 |
| JP | 2000515630 A | 11/2000 |
| JP | 2004163104 A | 6/2004 |
| WO | WO-2006052223 A1 | 5/2006 |
| WO | WO-2006096571 A2 | 9/2006 |
| WO | WO-2008097559 A2 | 8/2008 |
| WO | WO-2008130623 A1 | 10/2008 |
| WO | WO-2010111231 A1 | 9/2010 |
| WO | WO-2012154688 A2 | 11/2012 |
| WO | WO-2016118949 A1 | 7/2016 |
| WO | WO-2016187561 A1 | 11/2016 |
| WO | WO-2016201163 A1 | 12/2016 |
| WO | WO-2016201430 A1 | 12/2016 |
| WO | WO-2017027838 A1 | 2/2017 |
| WO | WO-2017180949 A1 | 10/2017 |
| WO | WO-2018200896 A1 | 11/2018 |
| WO | WO-2019032690 A1 | 2/2019 |
| WO | WO-2019094775 A1 | 5/2019 |
| WO | WO-2020087032 A2 | 4/2020 |
| WO | WO-2021067353 A1 | 4/2021 |
| WO | WO-2022146770 A1 | 7/2022 |
| WO | WO-2023023492 A1 | 2/2023 |

OTHER PUBLICATIONS

Clausell-Tormos, et al., "An Automated Two-phase Microfluidic System for Kinetic Analyses and the Screening of Compound Libraries," Lab on a Chip, 2010, Issue 10, pp. 1302-1307.

Communication pursuant to Article 94(3) EPC for European Patent Application No. 16 740 896.2 dated May 9, 2019. 4 pages.

Communication pursuant to Article 94(3) EPC for European Patent Application No. 16 740 896.2 dated Sep. 21, 2020. 4 pages.

Communication pursuant to Article 94(3) EPC for European Patent Application No. 18206472.5 dated Jan. 7, 2020. 5 pages.

Communication pursuant to Article 94(3) EPC for European Patent Application No. 18206472.5 dated Sep. 16, 2020, 5 pages.

Extended European Search Report for European Patent Application No. 16 74 0896, dated Jun. 6, 2018. 8 pages.

Extended European Search Report for European Patent Application No. 16808519.9, dated Nov. 12, 2018. 9 pages.

Extended European Search Report for European Patent Application No. 18206472.5, dated Jan. 22, 2019. 9 pages.

Extended European Search Report dated Dec. 1, 2020, for EP Application No. 18791954.3, filed on Apr. 27, 2018, 7 pages.

Extended European Search Report dated Jul. 28, 2021, for EP Application No. 18 844 318.8, filed on Aug. 8, 2018, 12 pages.

Extended European Search Report dated Oct. 10, 2022, for EP Application No. 19876942.4, filed on Oct. 25, 2019, 9 pages.

Extended European Search Report dated Oct. 5, 2021 for EP Application No. 18876268.6, filed Nov. 9, 2018, 9 pages.

Final Rejection dated Dec. 12, 2019, from U.S. Appl. No. 15/005,341, 34 pages.

Final Rejection dated Feb. 4, 2019, from U.S. Appl. No. 15/005,341, 42 pages.

International Application No. PCT/US2018/060104, International Search Report dated Feb. 28, 2019, 14 pages.

International Search Report and Written Opinion for International Application No. PCT/US2022/074985 dated Jan. 6, 2023, 18 pages.

International Search Report dated Oct. 23, 2018, for PCT Application No. PCT/US2018/045793, filed on Aug. 8, 2018, 2 pages.

International Search Report and Written Opinion dated Sep. 1, 2016 for PCT Application No. PCT/US2016/037225 filed Jun. 13, 2016. 5 pages.

International Search Report and Written Opinion dated Jan. 15, 2020, for PCT Application No. PCT/US2019/058202, 8 pages.

International Search Report and Written Opinion dated Jun. 15, 2022, for PCT Application No. PCT/US2021/064512, filed on Dec. 21, 2021, 19 pages.

International Search Report and Written Opinion of the International Searching Authority dated Jul. 12, 2018, for PCT Application No. PCT/US2018/029692, 22 pages.

International Search Report dated Jun. 2, 2016 for PCT/US16/14704. 18 pages.

Non-Final Rejection dated Jun. 3, 2019, from U.S. Appl. No. 15/005,341, 33 pages.

Non-Final Rejection dated Mar. 9, 2018, from U.S. Appl. No. 15/005,341, 15 pages.

Notice of Allowance dated Jan. 18, 2023, for U.S. Appl. No. 16/637,406, filed Feb. 7, 2020, 12 pages.

Notice of Allowance dated Nov. 9, 2022, for U.S. Appl. No. 16/637,406, filed Feb. 7, 2020, 12 pages.

Notice of Allowance dated Aug. 21, 2020, from U.S. Appl. No. 15/005,341, 36 pages.

Notice of Allowance dated Dec. 4, 2020, from U.S. Appl. No. 15/005,341, 7 pages.

Notice of Allowance dated Apr. 5, 2023, for U.S. Appl. No. 17/722,246, filed Apr. 15, 2022, 11 pages.

Notice of Allowance dated Apr. 24, 2023, for U.S. Appl. No. 16/637,406, filed Feb. 7, 2020, 11 pages.

(56) References Cited

OTHER PUBLICATIONS

Notice of Allowance dated May 5, 2023, for U.S. Appl. No. 17/722,246, filed Apr. 15, 2022, 10 pages.
Partial Supplementary European Search Report dated Apr. 21, 2021, for EP Application No. 18 844 318.8, filed on Aug. 8, 2018, 12 pages.
Resto, Pedro J. et al., "High Speed Droplet-based Delivery System for Passive Pumping in Microfluidic Devices", Sep. 2, 2009, Journal of Visual Experiments, Issue 31, p. 1-5. (Year: 2009).
Written Opinion dated Jun. 2, 2016, for PCT Application No. PCT/US2016/014704, filed on Jan. 25, 2016, 8 pages.
Written Opinion of the International Searching Authority dated Oct. 23, 2018, for PCT Application No. PCT/US2018/045793, filed on Aug. 8, 2018, 10 pages.
Xiaowen Huang et al., "On-Site Formation of Emulsions by Controlled Air Plugs", Small, vol. 10, No. 4, Feb. 1, 2014 (Feb. 1, 2014), pp. 758-765.
Zhu and Wang, "Passive and active droplet generation with Microfluidics: a review" Lab Chip (2017) 17:34-75.

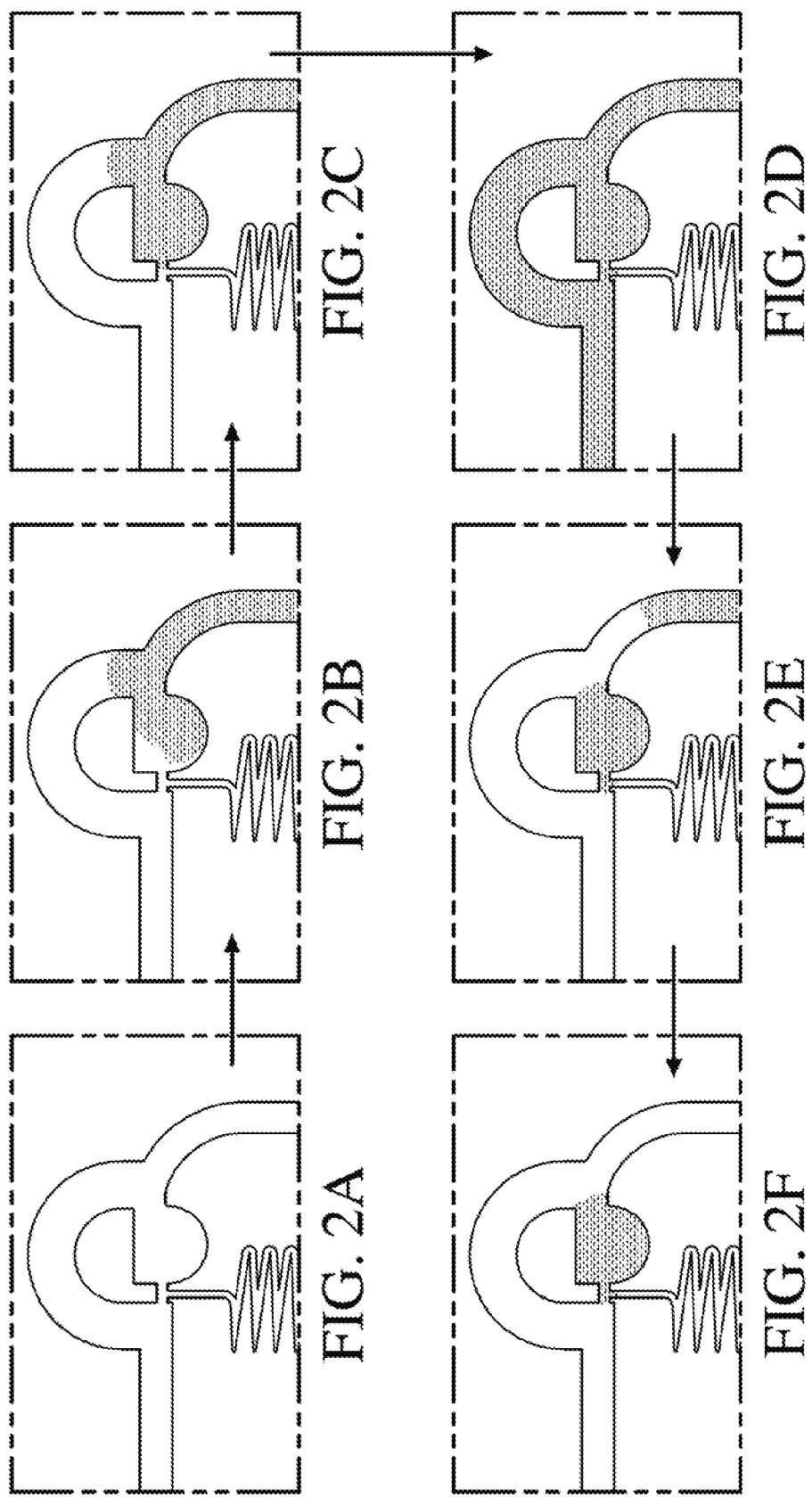

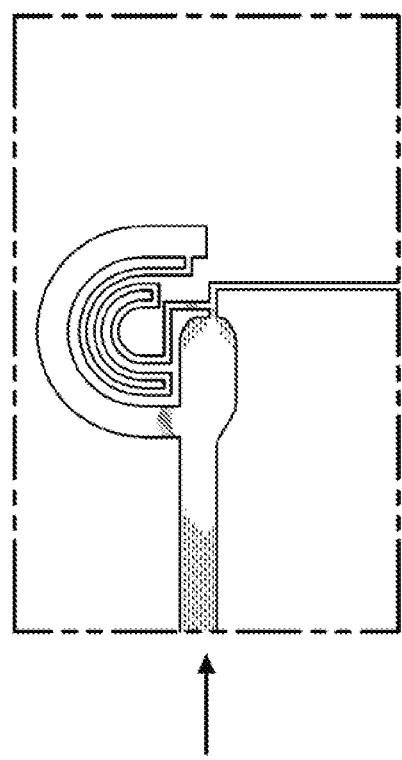
FIG. 9A
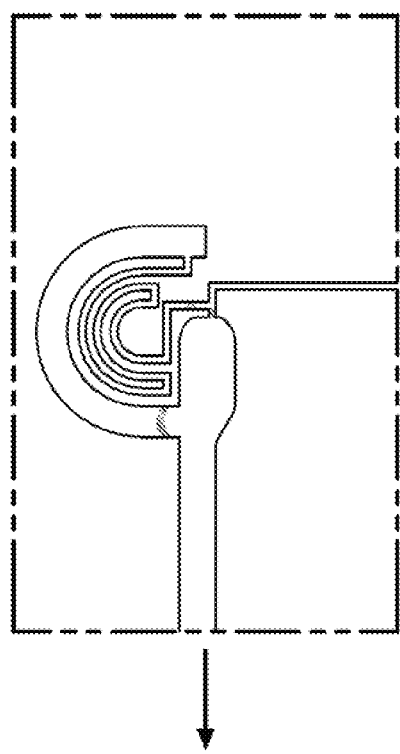
FIG. 9B
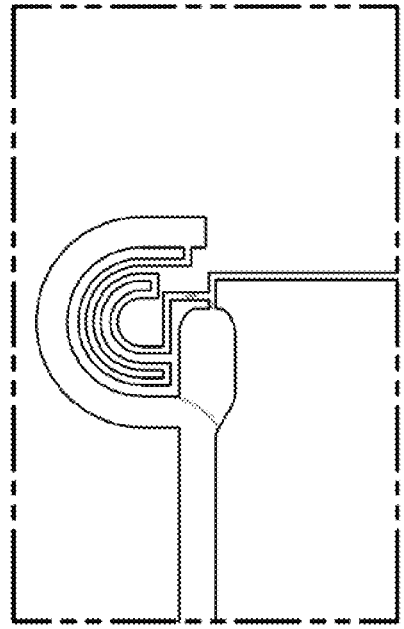
FIG. 9C
FIG. 9D

FLUIDIC DEVICES WITH REACTION WELLS AND USES THEREOF

RELATED APPLICATIONS

This application is a continuation of International Patent Application Number PCT/US2018/029692, "FLUIDIC DEVICES WITH REACTION WELLS AND USES THEREOF", filed Apr. 27, 2018, incorporated by reference herein in its entirety, which claims the benefit of U.S. Ser. No. 62/491,961 filed on Apr. 28, 2017, incorporated by reference herein in its entirety.

FIELD OF THE DISCLOSURE

This disclosure is generally related to the manipulation of fluids in a microfluidics environment.

BACKGROUND OF THE DISCLOSURE

Droplet-based microfluidic systems are useful tools for lab-on-a-chip applications where droplets are used as microreactors to perform reactions (reviewed in Zhu, P. and Wang, L. 2017. *Lab Chip* 17:34-75). For the purposes of these applications, it is desirable to have a uniform droplet size and the ability to modify droplets in a multi-plex environment with single-plex sensitivity and without contamination.

Currently used microfluidics systems have limited capabilities for performing multiple reactions in parallel without cross contamination. For example, the systems require complex methods (active valves) or immiscible fluids (e.g., oil) with upstream or downstream droplet mergers to manipulate droplets and do not have the ability to directly perform operations on the stored droplet, which inhibits use in multiplexed operations or point of care applications. Other deficiencies include the inability to completely wash out, clean and re-store a defined volume of a second droplet at the region of the first droplet for operations involving immunoassays or an inability to store different reagents of droplets in a series of traps.

There is a need in the art for microfluidics systems that enable biochemical, cellular, immunological, or molecular assays to be performed completely on-chip with or without the use of precise fluidic controls and with single-plex sensitivity and without cross-contamination.

SUMMARY OF THE DISCLOSURE

This disclosure provides fluidic devices that can be useful in a wide variety of applications from point of care diagnostics to laboratory tests. The fluidic devices provided herein comprise an air control valve (e.g., a passive air control valve) in direct fluidic communication with a fluidic connection. In some aspects, the fluidic device comprises at least one overflow channel and at least one reaction well connected to one another by the fluidic connection. In other aspects, the fluidic device comprises at least one high resistance air valve constriction channel and at least one reaction well connected to one another by the fluidic connection. Also provided herein are fluidic systems that include a plurality of any of the fluidic devices presented herein adjoined in a series; methods of filling reaction wells of fluidic devices and systems disclosed herein with fluid; and methods of manipulating fluids using the fluidic devices and systems. The compositions and methods disclosed herein allow multiple tests to be performed individually on multiple samples using one or more reagents in reactions wells connected to one another with single-plex sensitivity and without cross-contamination.

In some embodiments of the compositions presented herein, the air control valve has a geometric structure other than straight that increases hydrodynamic resistance as compared to the hydrodynamic resistance provided by a geometrically straight air control valve. In some embodiments of the methods presented herein, the fluid (e.g., an aqueous solution and/or air) can be introduced using a pipette or syringe pump. In other embodiments, the opening and closing of the air control valve port can be manual and/or automated.

In some embodiments, this disclosure provides a fluidic device comprising: a first port; a first fluid transport channel in fluid connection with the first port, a reaction well, and, an overflow channel; a second fluid transport channel in fluid communication with the overflow channel; a fluidic connection channel comprised of a hydrophobic material and being in fluid communication with the reaction well and the second fluid transport channel; and, a second port in fluid communication with the second fluid transport channel. In some embodiments, this fluidic device further comprises a fluidic mixer comprises a serpentine mixing channel in fluidic communication with the second fluid transport channel; a third fluid transport channel in fluidic communication with the serpentine mixing channel, the third fluid transport channel optionally comprising a mixing window; a fourth fluid transport channel in fluid communication with a second port; a fifth fluid transport channel in fluid communication with a third port; wherein the fourth and fifth transport channels are in fluidic communication with one another distal from their respective ports, and further in fluidic communication with the third fluid transport channel. Mulitple such fluidic devices may be arranged onto support surface. The movement of fluids into and out of such fluidic devices may be manual and/or automated.

Other embodiments are also contemplated, as will be understood by those of ordinary skill in the art from this disclosure.

BRIEF DESCRIPTION OF THE DRAWINGS

In FIGS. 1A and 1B, 1 is a first port; 1A is a first fluid transport channel; 2 is a reaction well; 3 is an overflow channel; 4 is a fluidic connection; 5 is an air control valve, 6 is a port for the air control valve into the atmosphere, 7 is a second port; and 7A is a second fluid transport channel. In FIG. 1B, the air control valve 5 has a geometric structure other than straight (i.e., serpentine) that provides increased hydrodynamic resistance as compared to the geometrically straight air control valve in FIG. 1A.

FIGS. 2A-2F provide a series of schematic representations of microscopic images showing operation of the fluidic device when the air control valve is open to the atmosphere. A fluid is introduced into the first port and enters the overflow region in FIG. 2B, wherein increased hydrodynamic resistance in the overflow channel causes the fluid to flow into the reaction region (FIG. 2C). Passing air forces excess fluid out the second port (FIG. 2D), while the port for the air control valve is kept open to allow fluid to form a fluidic connection (FIGS. 2D-2F).

In FIG. 4A, schematic representations of microscopic images of reaction wells after colorimetric ELISA (Clenbuterol ELISA kit, Neogen, Lexington, Ky., USA) are shown. The upper panel of pictures represents the negative control, while the lower panel of pictures represents a clenbuterol sample of 8.1 ng/mL. The negative (no drug) and positive (with drug) controls were clearly distinguishable in the fluidic device after photographing the results of the colorimetric reaction. FIG. 4B shows a comparison of ELISA data (Clenbuterol ELISA kit, Neogen, Lexington, Ky., USA) obtained using different platforms: 96 well plate, 384 well plate, and the fluidic device disclosed herein (labeled as "FD"). Two end point detection modes, colorimetric and fluorescence, were read using a Perkin Elmer Victor-3 1420 multiwell plate reader.

In FIG. 5, 1 is a first port of a first fluid transport channel 1A; 1B is a first intradevice fluid transport channel; 2 is a reaction well; 3 is an overflow channel; 3A is a second intradevice fluid transport channel; 4 is a fluidic connection; 5 is an air control valve; 6 is a port for the air control valve; and 7 is a second port of a second fluid transport channel 7A. A plurality of fluidic devices are positioned between the first fluid transport channel 1A and the second fluid transport channel 7A.

In FIG. 6A, two fluids are introduced (Fluids A and B), and in FIG. 6B, a different fluid is introduced into each of the 12 reaction wells in a series (Fluids C, D, E, F, G, H, I, J, K, L, M, and N).

FIGS. 9A-9D provide a series of schematic representations of microscopic images showing the manipulation of a stored droplet in a reaction well of a fluidic device containing a passive air control valve and a high resistance air valve constriction channel (FIG. 9A). The second port is blocked and a second fluid is introduced into the air control valve port. The second fluid enters the reaction well and coalesces with the first fluid (FIG. 9B). Depending on the flow rate and volume of the second fluid, the first fluid can be diluted or completely washed out of the reaction well, exiting through the first port (FIGS. 9C-9D).

In FIG. 10, 7 is a first port of a first fluid transport channel 7A; 6 is a second port of a second fluid transport channel 6A; and a plurality of fluidic devices are positioned between the first fluid transport channel 7A and the second fluid transport channel 6A wherein each fluidic device has a first intradevice fluid transport channel 7B; a reaction well 3; a high resistance air valve constriction channel 4; an overflow channel 5; a fluidic connection 2; an air control valve 1A; a port for the air control valve 1; and a second intradevice fluid transport channel 6B.

In FIG. 11, the fluidic device consists of an air control valve port 1, an air control valve 1A, a fluidic connection 2, a reaction well 3, a high resistance air flow constriction channel 4, an overflow channel 5, a port 6, and a fluid transport channel 6A. In FIG. 11, the high resistance air flow constriction channel 4 is in direct fluidic communication with overflow channel 5 and fluidic connection 2.

In FIG. 12, the first subunit fluidic device includes a first port 7 for a first fluid transport channel 7A which is in direct fluidic communication with a second fluid transport channel 6A and a reaction well 3. The end of fluid transport channel 6A opposite first fluid transport channel 7A terminates in port 6. Reaction well 3 is in direct fluidic communication with overflow channel 5 and fluidic connection 2. Fluidic connection 2 is in direct fluidic communication with air control valve 1A and high resistance air flow constriction channel 4. High resistance air flow constriction channel 4 is in direct fluidic communication with overflow channel 5. Opposite its connection with reaction 3, overflow channel 5 is in direct fluidic communication with the fluid transport channel of the second fluidic device (8A) which includes the same components as the first subunit fluidic device but does not include the first fluid transport channel (e.g., not including 7A of the first fluidic device). This arrangement of parts continues through the third, fourth, fifth, sixth, and seventh subunit fluidic devices. The last subunit fluidic device, in FIG. 12 being the eighth subunit fluidic device, terminates with a sample outlet port connected to the last fluid transport channel (8A in FIG. 12).

DETAILED DESCRIPTION OF THE INVENTION

Disclosed herein are fluidic devices that use relative channel configurations and in some aspects a passive air control valve for droplet formation and manipulation, fluidic systems containing multiple fluidic devices adjoined to one another, and methods for droplet formation and manipulation in a fluidic device or system. The passive air control valve disclosed herein allows different reagents to be loaded into different reaction wells in a series such that the fluidic devices and systems presented herein can be used without the need for large, complex instrumentation, thus providing devices that can be used outside of a laboratory or hospital environment, for example for point of care or laboratory testing. It has been discovered that by controlling certain physical properties, such as surface tension and resistance, and by the physical configuration and connections of different elements of a microfluidic device, many of the shortcomings of prior art devices can be overcome without the need for complex and costly instrumentation.

Figure 5:
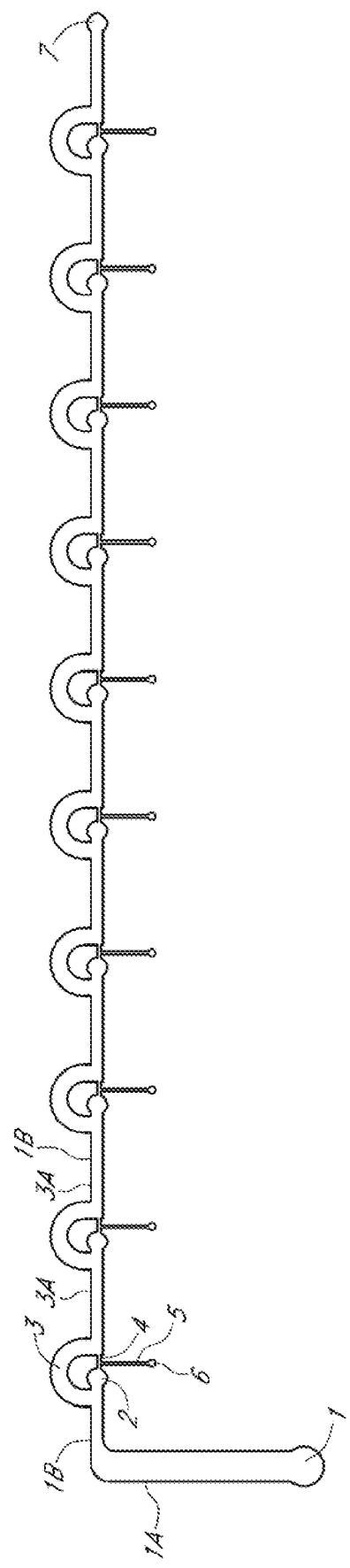
FIG. 5 illustrates a series of fluidic devices, each containing a passive air control valve, adjoined to one another.
Figure 7:
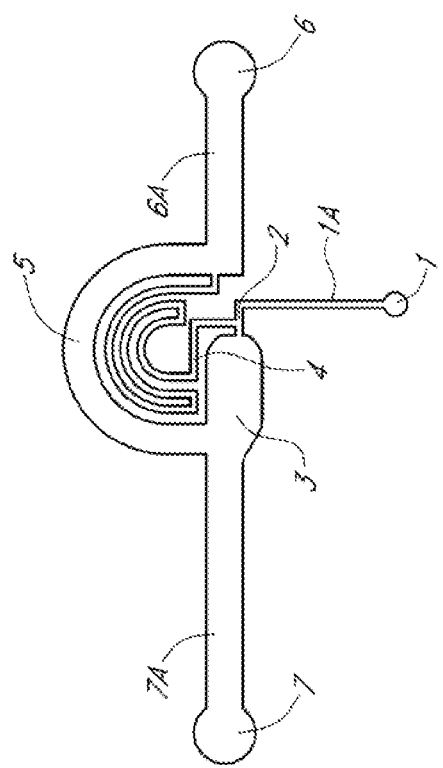
FIG. 7 is a diagram illustrating a fluidic device containing a passive air control valve and a high resistance air valve constriction channel. In the fluidic device shown in FIG. 7, 1 is an air control valve port; 1A is an air control valve; 2 is a fluidic connection; 3 is a reaction well; 4 is a high resistance air flow constriction channel; 5 is an overflow channel; 7 is a first port; 7A is a first fluid transport channel; 6 is a second port; and 6A is a second fluid transport channel.
Figure 8B:
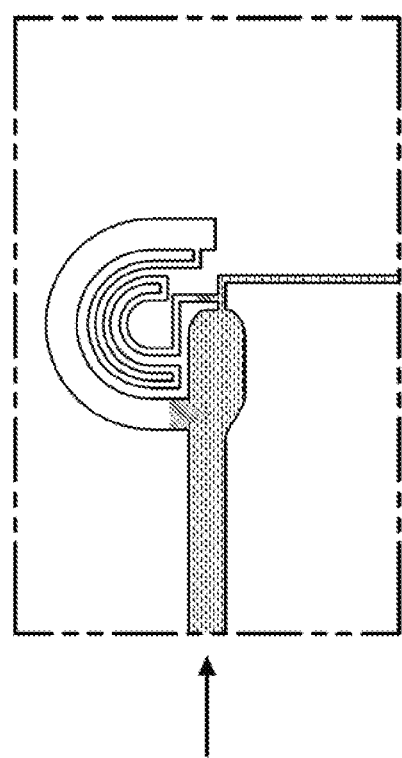
FIGS. 8A-8D provide a series of schematic representations of microscopic images showing operation of a fluidic device containing a passive air control valve and a high resistance air valve constriction channel during the filling of the reaction well using the air control valve port. The second port is blocked, and fluid is introduced into the air control valve port and preferentially enters the reaction well (FIG. 8B). Air is then introduced through the air control valve port. Due to the presence of fluid in the reaction well, the air enters the high resistance air valve constriction channel and passes into the overflow channel where it pushes any excess fluid out of the first port (FIG. 8C).
Figure 8C:
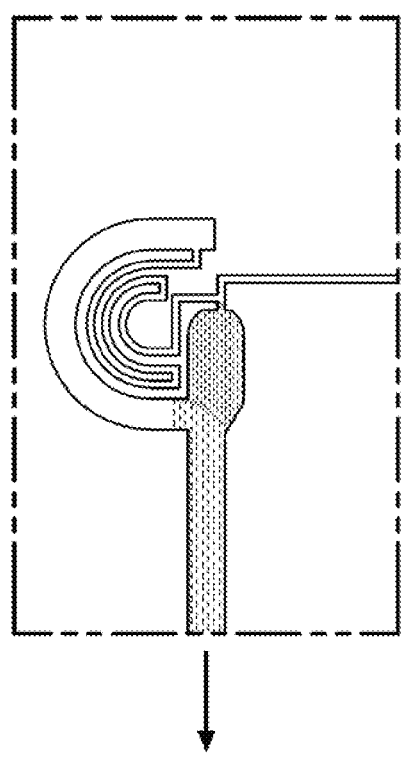
Figure 8A:
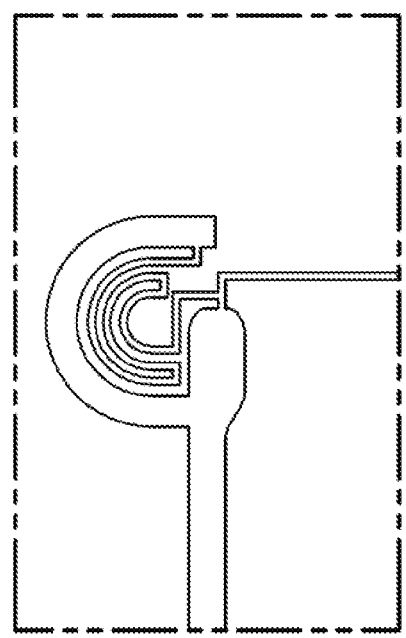
Figure 8D:
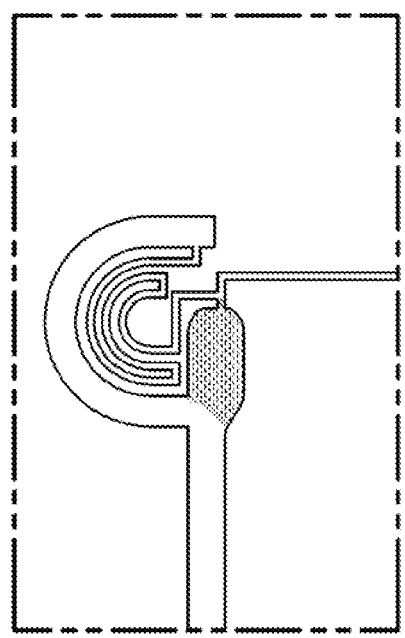

A "fluidic device" of this disclosure is a device through which one or more fluids can be transported and/or moved through the same. The movement of the one or more fluids can be, for instance, through passages formed within and/or upon such a device. An exemplary fluidic device of this disclosure is illustrated in FIGS. 1, 5, 7, and/or 10-14. In some embodiments, the fluidic device can be a millifluidic, microfluidic or nanofluidic device in which the amount of fluids within, stored within or moving within said device can be in milliliter, microliter, nanoliter, and/or picoliter amounts. Thus, in some embodiments, the reaction well is configured to hold milliliters of a fluid. In other embodiments, the reaction well is configured to hold microliters of a fluid. In other embodiments, the reaction well is configured to hold nanoliters of a fluid. In other embodiments, the reaction well is configured to hold picoliters of a fluid. As such, a fluidic device presented herein can be a millifluidic, microfluidic, nanofluidic, or picofluidic device. In illustrative embodiments, the fluidic device is a microfluidic device.

Figure 1A:
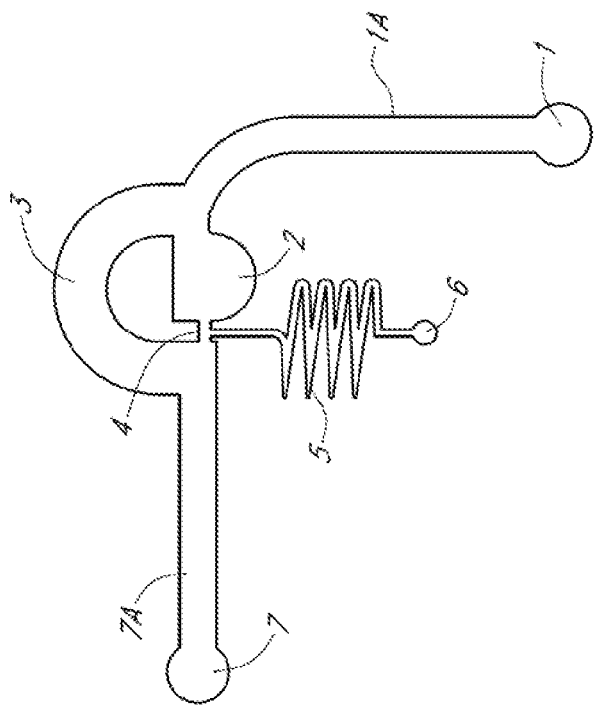
FIGS. 1A and 1B are diagrams illustrating a fluidic device having an air control valve port, the opening and closing of which regulates the filling of the reaction well with a fluid.
Figure 1B:
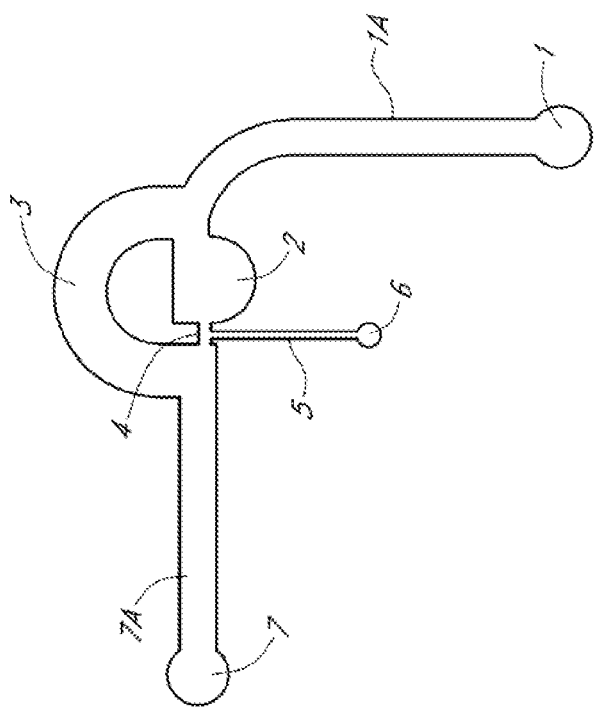

The fluidic devices described herein typically comprise multiple parts or regions therein through which fluids can move and/or in which fluids can be stored and/or manipulated. Such parts and/or regions can include, for example, one or more ports, one or more air valves (e.g., associated with or connected to a port), one or more channels that can form a fluidic connection, one or more high resistance air valve constriction channels, one or more reaction wells, one or more overflow channels, and one or more fluid transport channels. Where a high resistance air valve constriction channel is present in the fluidic device, it is typically positioned upstream (relative to movement of air or fluid through the fluidic device) of the fluidic connection. In some embodiments, the fluidic device also includes one or more inlets and/or outlets (e.g., ports) that may perform as an inlet, an outlet, or both. The different parts and/or regions typically communicate with one another either directly or indirectly with respect to fluids moving through the same (e.g., the parts or regions are in "fluidic communication" with one another (e.g., the parts or regions "fluidly communicate" with one another)). Direct communication between parts and/or regions means that a fluid moves directly from one part or region to another without passing through an intermediary part or region, which can be referred to herein as "direct fluidic communication". For instance, as shown in FIGS. 1A and 1B, fluidic connection 4 is in direct fluidic communication with air control valve 5, reaction well 2, and fluid transport channel 7A. Indirect communication, in contrast, means that fluid moves from one part or region to another through an intermediary part or region, referred to herein as "indirect fluidic communication". For example, referring to FIGS. 1A and 1B, air control valve 5 is in indirect fluidic communication with reaction well 2 as the two parts or regions are each directly connected to fluidic connection 4 but not to one another. Similarly, the parts of the fluidic devices illustrated in FIGS. 13 and 14 may also be arranged to be in fluidic communication with one or more other parts of such fluidic devices (e.g., a first fluid transport channel (1A) in fluid connection with the first port (1), a reaction well (2) and an overflow channel (3) (FIG. 13); a serpentine mixing channel (5) in fluidic communication with a second fluid transport channel).

Figure 10:
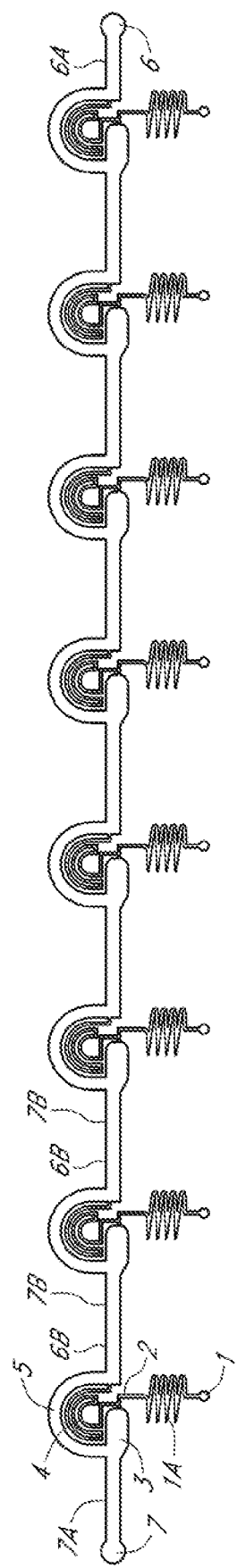
FIG. 10 is a diagram of a series of fluidic devices adjoined to one another, with each containing both a passive air control valve and a high resistance air valve constriction channel.
Figure 12:
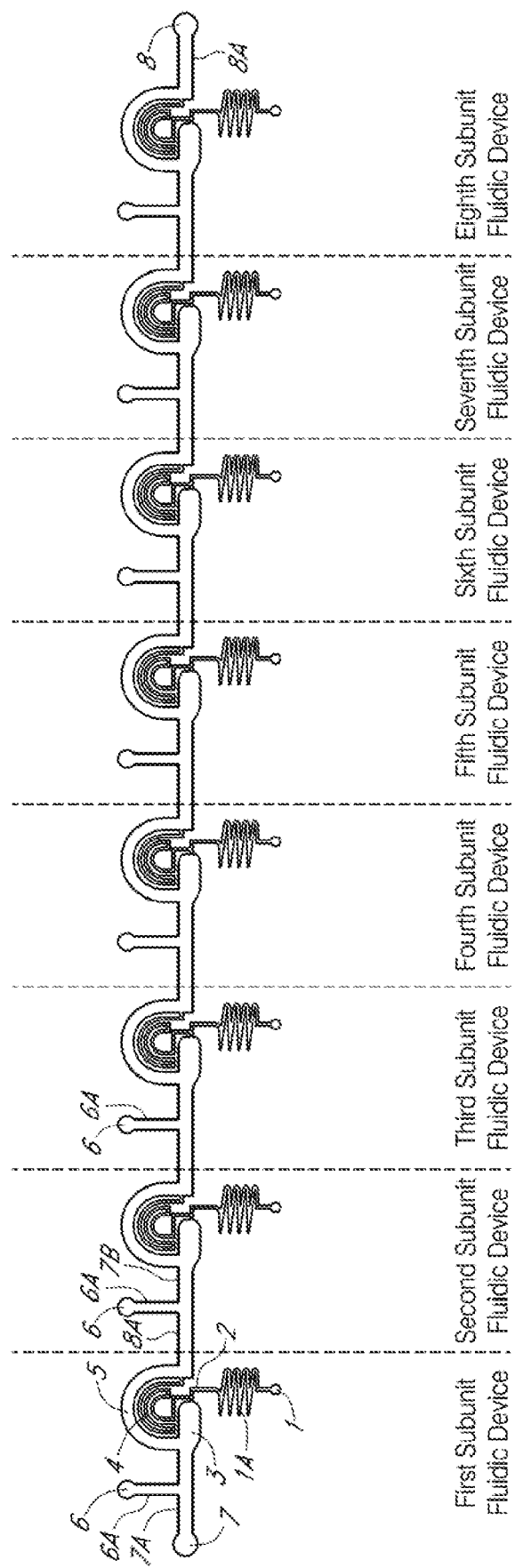
FIG. 12 is a diagram illustrating a series of fluidic devices adjoined to one another, with each containing both a passive air control valve, a high resistance air valve constriction channel, and a sample port/channel.

Individual fluidic devices can also be connected to one another as in series as, referred to herein as a "fluidic system". Examples of multiple fluidic devices connected to one another in series are shown in FIGS. 5, 10 and 12. In such embodiments, each fluidic device can be attached to one another though a fluid transport channel. For instance, FIG. 5 shows a first fluidic device connected to a second fluidic device through fluid transport channels 3A and 1B, which collectively can be referred to as "intradevice fluid transport channel". In such embodiments, the fluid transport channel of the first fluidic device (e.g., 3A in FIG. 5) can be considered "continuous with" the fluid transport channel of the second fluidic device (e.g., 1B of FIG. 5). In such embodiments, the fluid transport channels are typically in direct fluidic communication with one another.

The fluidic device described herein in certain illustrative embodiments comprise an "air control valve" which is a valve through which air can enter or leave the fluidic device. In some embodiments, such a valve can allow air to move into, or alternatively out of, the fluidic device when open to the surrounding atmosphere. As mentioned above, in some embodiments, the air control valve is configured such that the hydrodynamic resistance therein is greater than the hydrodynamic resistance in the fluidic connection and the overflow channel, thereby hindering the flow of fluid into the air control valve. The hydrodynamic resistance may be calculated using standard techniques in the art. For example, hydrodynamic resistance R for a rectangular channel of sufficiently small aspect ratio (e.g., h/w<0.1) can be found using the formula: $R=12 \mu L/wh^3$ where $\mu$ is the viscosity of the fluid, L is the length of the channel, w is the width and h is the height of the channel. The air control valve can also be configured to further increase hydrodynamic resistance by increasing the length of the air control valve. In some embodiments, the length of the air control valve is increased by changing the geometric structure. In illustrative embodiments, the air control valve has a geometric structure other than straight that increases the length of the air control valve and thus, its hydrodynamic resistance. In certain embodiments, the air control valve has a serpentine shape. Exemplary air control valves can include those having a structure and/or arrangement as illustrated as, for instance, without limitation, 4 or 5 in FIGS. 1A and 1B; 5 in FIG. 5; and/or 1A in FIGS. 7 and/or 10-12. In some embodiments, the air control valve can form a straight path between a port and a fluidic connection (e.g., 5 in FIG. 1A and/or 1A in FIG. 7).

In some embodiments, the air control valve can form geometric structure other than a straight path such as a serpentine shape as shown in FIG. 1B (5). Such an air control form having a geometric structure other than a straight path (e.g., a serpentine geometry as in 5 of FIG. 1B) is typically one providing increased hydrodynamic resistance to a fluid moving through the same as compared to an air control valve forming a straight path (5 in FIG. 1A). The air control valve can also be fluidly connected to a port through which fluid can enter or exit the air control valve. An exemplary air control valve port is shown as 6 in FIGS. 1A and 1B.

The fluidic devices described herein can also comprise a "fluidic connection" in direct fluidic communication with reaction well and a fluid transport channel (4 in FIGS. 1A and 1B; 4 in FIG. 13) or between a reaction well and/or a high resistance air valve constriction channel (4 in FIG. 7). As used herein, a "fluidic connection" is a channel that fills with fluid, thereby preventing fluid from escaping the reaction well and allowing passing air to bypass the reaction well and remove any excess fluid in the channel. For instance, FIGS. 1A and 1B illustrate "fluidic connection" as part (4).

In some embodiments, a fluidic connection can be in direct communication with a high resistance air valve constriction channel via air (e.g., 4 of FIG. 7). Such a high resistance air valve constriction channel will be understood by those of ordinary skill in the art as providing higher resistance (e.g., by presenting a greater surface area) to any fluids or air moving through the same as compared to the fluidic connection (e.g., part (4) of FIGS. 1A and 1B) such that a selected fluid can be prevented from entering the high resistance air valve constriction channel.

The "reaction well" is typically a compartment or region (e.g., a depression) of the fluidic device into which an initial reagent such as a primary/capture antibody solution can be trapped for a period of time to coat the surface with antibody or specified reagent, after which a test sample (e.g., a bodily fluid such as blood, urine, tissue extracts, and cellular extract) can reside and/or be trapped. Further, other assay reagents e.g. secondary antibody, wash buffer, detection substrates, stop reagents etc. can be passed through the same reaction well to complete the reaction before readouts. The reaction well is typically composed of a material allowing for sample components and/or reagents to be fixably attached thereto (removably or not), such as at the surface of the material forming the reaction well. In some embodiments, the shape of the reaction well is configured for an operation or assay of interest. In some embodiments, a reaction well is rectangular for purposes of dilution or washing out of fluid samples in a reaction well. In other embodiments, the reaction well is rounded in shape (e.g., semi-circular) but may also have hexagonal, rectangular, or other suitable shape. Exemplary reaction wells include part 2 in FIGS. 1A and 1B; part 2 in FIG. 13; and part 3 in FIGS. 7 and 11. In some embodiments, a reaction well can be coated with a substance such as poly-L lysine, known to promote cell adhesion, and living cells can be present on and adhere to a reaction well.

An "overflow channel" of any of the fluidic devices described herein can provide a path through which fluid that can exceed the capacity of a "reaction well" thereof such that the fluid "overflows" into said overflow channel. The overflow channel(s) are typically connected to a fluid transport channel and/or reaction well as shown in FIGS. 1A and 1B (e.g., overflow channel 3) or FIG. 13 (overflow channel 3).

Figure 13:
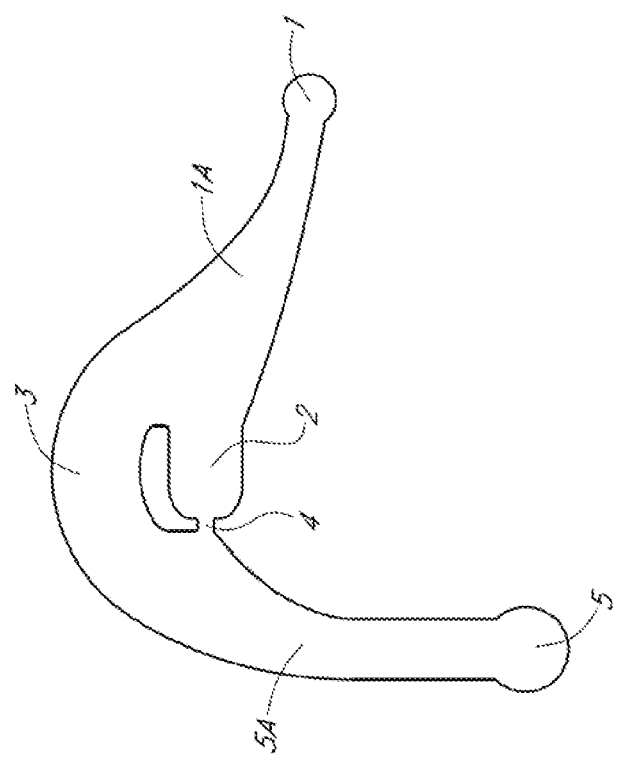
FIG. 13 illustrates an exemplary fluidic device comprising a first port (1), a first fluid transport channel (1A), a reaction well (2), overflow channel (3), a fluidic connection (4), a second fluid transport channel (5A), and a second port (5).
Figure 14:
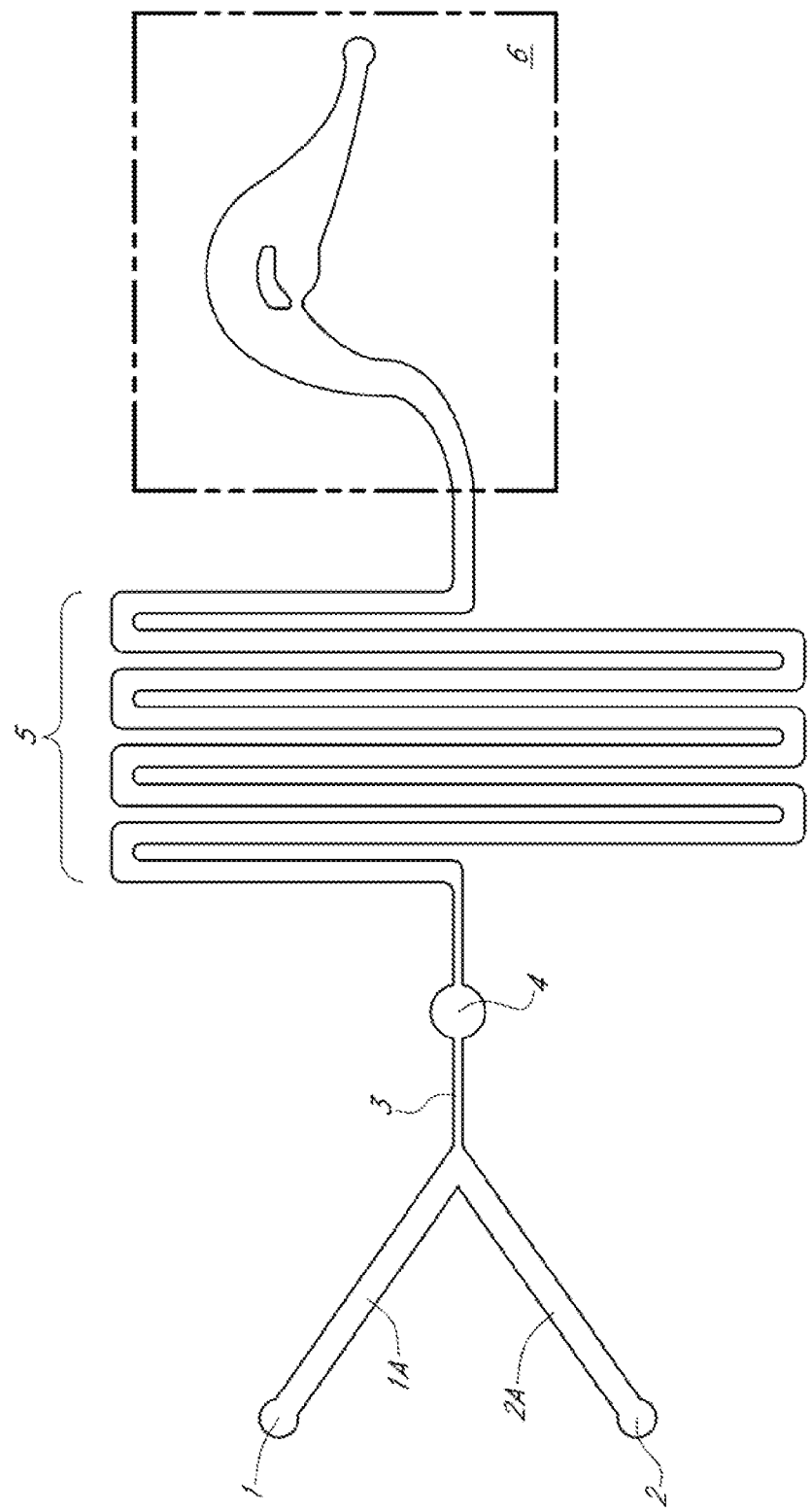
FIG. 14 illustrates an exemplary fluidic device comprising a device illustrated in FIG. 13 but lacking second port (5) (designated part 6 in FIG. 14), in fluid communication with a fluidic mixer comprising at least two ports (1 and 2), a third (or downstream) fluid transport channel (3) with mixing window (4), and a serpentine mixing channel (5). The device illustrated in FIG. 13 but lacking second port (7) (designated part 6 in FIG. 14) is in fluid connection to the fluidic mixer by fluidic communication between the second fluid transport channel (5A in FIG. 13) and the serpentine mixing channel (5), perhaps through an additional fluid transport channel positioned between the two.

A fluid transport channel such as 1A and 7A of FIGS. 1A and 1B; 1A and/or 5A in FIG. 13; or 1A, 2A, or 3 in FIG. 14; can be used to introduce and/or extract fluids from the fluidic device. Such fluid transport channels can be in direct fluidic communication with, for instance, a reaction well and/or an overflow channel (e.g., 1A, 2 and 3, respectively, of FIGS. 1A and 1B; 1A, 2, and 3 of FIG. 13). Such fluid transport channels can alternatively and/or also be in direct fluidic communication with, for instance, an overflow channel and a fluidic connection (e.g., 7a, 3 and 4, respectively, of FIGS. 1A and 1B; 3, 4, and 5A of FIG. 13). Such fluid transport channels can also be connected to one or more ports through which fluid can enter or exit the fluid transport channel. Exemplary ports include, for instance, 1 and 7 of FIGS. 1A and 1B; 1 and 5 of FIGS. 13; or 1 and 2 of FIG. 14). An "intradevice transport channel" can be a fluid transport channel formed between devices that are connected to one another (e.g., in fluidic communication with one another) and/or connected in series (e.g., 3A/1B of FIG. 5). In some embodiments, such as when multiple fluidic devices are connected with one another in series (as in, e.g., FIGS. 5, 10 and 12), the reaction well of one fluidic device is able to hold or maintain a fluid, sample component(s), and/or reagent(s) such that the same is not able to move into another fluidic device (e.g., a reaction well thereof) in the series (e.g., that reaction well can hold a fluid without contaminating fluids contained in adjoining fluidic devices). In some embodiments of the fluidic system disclosed herein, cross contamination between individual fluidic devices is minimal, such that less than, for example, 1%, 0.9%, 0.8%, 0.7%, 0.6%, 0.5%, 0.4%, 0.3%, 0.2%, or 0.1% of the contents of a first reaction well carry over into a second reaction well during a wash step.

The ports of the fluidic devices described herein can be individually open or closed at any given time while the fluidic devices are in use to enable operations to be performed (e.g., to carry out an immunoassay). Such ports can be opened or closed (e.g., blocked or unblocked) using any available method, such as using the operators finger, one or more pipettors, one or more syringe pumps, and/or an automated system (e.g., using a solenoid control valve, pneumatic control channels, or other system available to those of ordinary skill in the art). For instance, when an air control valve port (e.g., 6 in FIGS. 1A and 1B) is open (e.g., open to the atmosphere such that a fluid such as air can enter the same), a fluid can enter the fluidic connection (e.g., 4 in FIGS. 1A and 1B) through the air control valve (e.g., 5 in FIGS. 1A and 1B) and fill the reaction well. In this way, the "fluidic connection" can prevent fluid from escaping the reaction well. Similarly, a fluid can be introduced into the fluidic device through a port connected to a fluid transport channel (e.g., 7/7A or 1/1A in FIGS. 1A and 1B). Excess fluids (e.g., a volume of fluid beyond what is required for a particular assay and/or can be contained within the fluidic device) can be removed from the fluidic device through the ports. Thus, in some embodiments, a fluid is introduced into a fluidic device having a passive air control valve using a pipette, syringe pump, or any other fluid driving mechanism (referred to herein as "fluid introduction devices"). In illustrative embodiments, fluids are introduced using standard micropipettes (about any of 0.001-30 microliters).

In some embodiments, operation of a fluidic device having a passive air control valve for purposes of generating a droplet involves opening the port of the air control valve and then introducing a fluid followed by passing air into the first port of a first fluid transport channel. In this embodiment, the fluid enters the overflow region, increasing the hydrodynamic resistance therein, which causes the fluid to flow into the reaction well, forming a droplet. The passage of air immediately following fluid introduction forces excess fluid out of the overflow channel, into the second fluid transport channel, and out the second port. Alternatively, excess fluid can be aspirated back into the fluid introduction device. The port of the air control valve can be kept open to cause formation of the fluidic connection between the reaction well and the second fluid transport channel, thereby preventing the escape of fluid from the reaction well. Fluid can enter the reaction well when the port of the air control valve is open to the atmosphere.

In some embodiments, operation of a fluidic device having a passive air control valve and a high resistance air valve constriction channel involves opening the port of the air control valve and then introducing a fluid followed by passing air into a port of a fluid transport channel. However, in some embodiments, fluid is introduced through the air control valve. In this embodiment, the fluid is introduced into the air control valve port, wherein the fluid enters the reaction well; and air is then introduced into the port of the air control valve, wherein the air enters the high resistance air valve constriction channel, causing excess fluid to be pushed through the fluid transport channel and out the port of the fluid transport channel. Alternatively, excess fluid can be aspirated back into the fluid introduction device. In some embodiments, the fluid can initially enter into the overflow channel and be rerouted, as resistance due to the fluid viscosity in the overflow channel is increased.

The fluids in the fluidic devices can be any suitable fluid including but not limited an aqueous solution, a sample (e.g., comprising components such as cells and/or antibodies, nucleic acids, or plasma), one or more buffers, water, and/or one or more wash solutions. In some embodiments, the fluid may be air but the term fluid is typically used herein to indicate a type of aqueous solution. Air is therefore typically referred to as such. Those of ordinary skill in the art will understand that many different types of fluids can be suitable for use with the fluidic devices described herein. For instance, to carry out an immunoassay, suitable fluids can include those comprising one or more sample(s) (e.g., a blood sample), one or more reagents (e.g., antibodies, primary and/or secondary), one or more wash buffers (e.g., phosphate-buffered saline), one or more detection agents (e.g., a fluorescently-labeled secondary antibody), and the like. As mentioned above, a fluid can also be and/or comprise air. In some embodiments, a pocket of air can be introduced between a fluid or fluids, producing an "air plug". In some embodiments, the fluid between air plugs can be referred to as a "fluidic slug". The same or different fluids can also be introduced into the same or different ports during operation of the fluidic device. In some embodiments, a first fluid can be introduced into a first port followed by a second fluid at a flow rate and volume that causes dilution or the washing out of a first fluid in the reaction well (but not necessarily components of a sample fixably attached to the surface of the reaction well) such that the second fluid can be contained or "trapped" within the reaction well with (e.g., coalesced with) or in place of the first fluid such that an assay such as an immunoassay can be performed. In some embodiments, an air plug can separate the first and second fluids during operation of the fluidic device.

In some embodiments, the fluid stored in the reaction well is manipulated by introducing a second fluidic slug into the first port or the second port, with the air control valve in the open position. The first port or the second port can be used interchangeably for introduction of fluids or for removal of excess fluid. In some embodiments in which the second port is used, fluid passes through the second fluid transport channel and the fluidic connection and into the reaction well, reversing the flow direction. In such embodiments, any excess fluid exits through the first port.

For instance, in some embodiments, the second fluid is a sample, a buffer, a water, or a wash solution and the second fluid can be introduced at a flow rate of between 0.7 nanoliters/sec to 5 microliters/sec. In some embodiments, the second fluid can be introduced at a flow rate and volume that causes dilution of the first fluid in the reaction. In some embodiments, the concentration of the first fluid after introduction of the second fluid can be less than about any of, for example, 50%, 40%, 30%, 20%, 10%, 5% 1%, 0.5%, or 0.1% of the concentration of the first fluid prior to the introduction of the second fluid. In some embodiments, the second fluid can introduced at a flow rate and volume that causes the first fluid to be washed out of the reaction well and/or replaced with the second fluid. Washing out of the reaction well can occur when the washing buffer or replacement fluid is introduced at a flow rate of between 0.7, 1.2, 1.7, 2.2, 2.7, and 3.2 microliters/sec on the lower end of the range to 2.7, 3.2, 3.7, 4.2, 4.7, and 5 microliters/sec on the upper end of the range. In illustrative embodiments, washing of the reaction vessel occurs when the washing buffer or replacement fluid is introduced at a flow rate of between 0.7 microliters/sec and 5 microliters/sec.

The fluidic devices can be fabricated using, for example, but not limited by, various soft lithographic micro-embossing techniques. A variety of fabrication micro-forming methods that utilize, for example, but are not limited to, micro-milling, micro-stamping, and micro-molding, can be matched to substrate material properties. In various embodiments of a device according to the present teachings, a substrate can be an optically transmissive polymer, providing good optical transmission from, for example at least about 85% to 90% optical transmission over a wavelength range of about 400 nm to about 800 nm. Examples of polymeric materials having good optical transmission properties for the fabrication of various embodiments of a fluidic circuit include organosilicon polymers. In some embodiments, a fluidic device presented herein is composed of hydrophobic materials. In some embodiments, the fluidic device is composed of hydrophobic materials such as polystyrene, polycarbonate, poly(methyl methacrylate) (PMMA), and/or polydimethylsiloxane (PDMS), polypropylene, cyclic-olefin polymers (COP), cyclic-olefin copolymers (COC), polystyrene polymers, polycarbonate polymers, acrylate polymers, and the like. Other hydrophobic materials may also be used as would be understood by those of ordinary skill in the art.

In some embodiments, the fluidic device has a height between about any of 100, 125, 150, 175, 200, and 225 microns on the low end of the range and about any of 200, 225, 250, 275, and 300 microns on the high end of the range. In illustrative embodiments, the fluidic device has a height of about any of 100-300 microns (e.g., about any of 100, 150, 200, 250 or 300 microns). In some embodiments, the first fluid transport channel and the second fluid transport channel are each about 400 microns in length. In other embodiments, the overflow channel has a length between about any of 400, 425, 450, 475, 500, and 525 microns on the low end of the range and about any of 500, 525, 550, 575, 600, and 625 microns on the high end of the range. In illustrative embodiments, the overflow channel has a length between about any of 400 and 625 microns. In other embodiments, the high resistance air valve constriction channel is about 80 microns in length. In some embodiments, the air control valve has a width between about any of 60, 65, and 70 on the low end of the range and about any of 70, 75, and 80 on the high end of the range. In other embodiments, the air control valve is about any of 60-80 microns in length. In FIG. 1A, for instance, air control valve 5 has a width of about 80 microns while the serpentine-shaped air control valve 5 of FIG. 1B has a width of about 60-80 microns. Other sizes may also be suitable as may be derived from this specification or the examples, and/or otherwise determined by those of ordinary skill in the art.

In some embodiments, manipulation of a fluid (e.g., as a droplet) occurs as part of an assay. Any suitable assay (e.g. an immunoassay, a biochemical assay, a drug discovery assay, a nucleic acid binding assay, and other that will be known by a skilled artisan) can be carried out using the fluidic devices described herein. Any number of fluidic slugs/reagents can be introduced using the fluidic device presented herein until all steps of an assay are completed. In some embodiments, the assay detects binding pair members using the fluidic device presented herein. In embodiments of the methods, a sample is introduced into a fluidic device having a passive air control valve as described previously. In some embodiments, on-device liquid handling can be externally actuated in manual or automated mode using standard laboratory liquid handling equipment. According to various embodiments of components, devices and methods of this disclosure, a pressure applied at or between ports can be used as a motive force for moving liquids, for example, from part of a fluidic device to another part of that or another fluidic device. For example, a motive force for on-device liquid handling can be externally actuated by applying a decreased or negative pressure at a port or between ports or by applying an increased or a positive pressure at a port or between ports. Given that a full vacuum by definition is the absence of pressure, for example, 0 torr, and given that 1 standard atmosphere of pressure is, for example 760 torr, then a negative pressure is a decreased pressure less than 760 torr, for example, and a positive pressure is an increased pressure greater than 760 torr, for example. In that regard, on-device liquid handling for various embodiments of components, devices and methods of this disclosure can be externally actuated using any manual or automated standard laboratory liquid handling equipment, such as by manual or automated pipetting systems utilizing solid or liquid displacement, that can provide a pressure from between about 720 torr to about 800 torr, which is about +/−40 torr from 1 standard atmosphere of pressure.

Fluidic devices provided herein can be used in any biological or biochemical method in which one or more samples are loaded into one or more reaction wells and one or more solutions are exchanged within the reaction well(s). A skilled artisan will recognize that a large number of such methods exist. Accordingly, a large number of samples can be delivered into a a fluidic device provided herein. Such samples can include cells, nucleic acid samples, protein samples, carbohydrate samples, buffers, reagents, organic compounds such as small organic candidate drug compounds, or combinations thereof, such as biological samples that are mixtures of these and other biochemicals, for example. Such biological samples can include, as non-limiting examples, blood, or a portion thereof, such as for example plasma or sera, tissue, tumor biopsy, sputum, cerebrospinal fluid, cells, and/or cell culture supernatant. In addition, any reagent that is used in such biological or biochemical methods may also be included. Such biological or biochemical methods can include, for example, immunological methods such as immunoassays (e.g. ELISAs), including but not limited to sandwich immunoassays, sample preparation methods, nucleic acid isolation and/or purification, cell culturing and imaging, nucleic acid assays, pharmaceutical drug candidate testing, or anti-drug antibody (ADA) assays.

In certain embodiments, for performance of biological assays using a fluidic device provided herein, a detection system, such as an optical detection system can be in optical communication with the fluidic device. For such embodiments, the device cover through which an optical detection system is in optical communication is ideally transparent, for example transparent glass or transparent plastic.

In some embodiments, the sample can be tested for the presence of a member of a binding pair complex (e.g., an antibody and an antigen to which the antibody binds), or for the presence of the complex, by introducing a second fluid containing a binding pair member (e.g., an antibody) and/or a detection agent. In some embodiments, the binding pair member (e.g., the antibody) is labelled to allow for detection. In some embodiments, the assay is an immunoassay (e.g., an ELISA) and the binding pair complex comprises an antigen and an antibody directed toward the antigen. In other embodiments, the assay is a nucleic acid based assay or an assay to assess DNA-protein interactions e.g. single nucleotide polymorphism (SNP) detection. For SNP detection, the reaction wells, either in single-/multi-plex device, can be coated with streptavidin, followed by introduction of specific biotin labeled DNA oligos into each reaction well. Each well would receive a different, but known oligo. The oligos would bind to the streptavidin followed by washing out the unbound oligos. DNA (optionally digested DNA) from a sample, mixed with fluorophore labeled nucleotides, buffer and enzyme can then be introduced into each well. DNA sequences complementary to the oligos would hybridize to the oligos and serve as templates for single-nucleotide base extension with labeled nucleotides or for amplification of a region of the bound DNA. The identity of the nucleotide added can be detected based on the fluorophore labels on the nucleotides by fluorescence emission using a camera. If the purpose is to amplify specific regions of the DNA for other purposes, the set up described above can also be used. The amplified DNA can be retrieved from each well and used for downstream applications. Other assays may also be carried out using the fluidic devices described herein, as may be determined by those of ordinary skill in the art.

For example, in embodiments involving an immunoassay, an antigen of interest (a binding pair member), is immobilized by direct adsorption to the reaction well of the fluidic device or via a capture antibody that has been attached to the reaction well of the fluidic device. A sample is tested for the presence of the antigen by introducing the sample (e.g., a blood sample) into the reaction well of the fluidic device as disclosed herein and detecting the antigen by contacting the sample with a second fluid containing a labelled primary antibody or a labelled secondary antibody. Detection can be, for example, colorimetric or fluorescence-based and can utilize a camera or plate reader.

For instance, in certain non-limiting embodiments, a target antibody or antigen if present in such first test sample or second test sample, for example, can coat the surface of a reaction well. The coated reaction well can then optionally be rinsed with a buffer, such as PBS or any buffer used in an immunoassay and then the surface of the reaction well blocked with an immunoassay blocking reagent, which are known in the art. Then a first test sample, such as a blood (or fraction thereof e.g. plasma or sera) from a first subject and a second test sample, which can be a blood sample from a second subject, or in non-limiting examples can be a control sample, can be delivered to the coated reaction well and incubated. Optionally, another antibody can be delivered to the reaction well and incubated. Then antibodies or antigens that bind components (if present) in the test samples that bound the coated antibody or antigen are delivered to the reaction well. This fluidic processing within the reaction well can be achieved by delivering samples into the reaction wells through, for instance, the ports shown in FIGS. 13 and/or 14, for example, according to one or more of the steps provided in Example 9 for introducing a sample into a reaction well and replacing fluids within the reaction well, and for mixing two solutions before introducing them into the reaction well.

In another non-limiting embodiment, an ADA assay can be performed using a fluidic device provided herein. A skilled artisan will realize that a fluidic device provided herein can be used in different ways to perform an ADA assay. As a non-limiting example, a biotherapeutic drug such as a biotherapeutic antibody can be delivered to a reaction well using methods provided herein for filling a reaction well of a microfluidic device. The biotherapeutic antibody and control antibody (if used) can be incubated in reaction wells to allow the biotherapeutic antibody and control antibody to coat the surface of the reaction wells. As a further step of the ADA assay, sera samples from subjects to whom the biotherapeutic antibody has been administered are each mixed with an acidic reagent as will be understood for ADA assays, and the acidified sera samples are each delivered to reaction wells using methods and microfluidic devices provided herein. A pH neutralizing reagent with a fluorescently-labeled antibody that recognizes the biopharmaceutical antibody, which will be referred to as a detection reagent, is applied to each of the reaction wells by delivery of the detection reagent thereto through one or more ports. Eventually, a detection system is used to identify wells containing fluorescent antibodies. Positive fluorescence from a biotherapeutic-coated sample reaction well but not a control antibody-coated reaction well is indicative of the presence of an anti-drug antibody in the subject sample applied to that reaction well. In certain illustrative embodiments using FIG. 14 herein, the acidified sample and the detection reagent can be delivered into ports 1 and 2 and mixed within the mixing channel (5), before being delivered to a reaction well.

In another non-limiting embodiment, a microfluidic device provide herein can be used to perform one or more sample preparation steps in a next-generation (i.e. massively parallel) sequencing workflow. In some embodiments, isothermal amplification reactions can be performed in the reaction wells and then amplification products can be removed from the reaction wells using methods for exchanging fluidic contents of a reaction well provided herein, and collected for further processing in a next-generation (e.g. massively multiplex) sequencing workflow.

Other embodiments of such methods are also contemplated as being suitable for use with the fluidic devices provided herein, as will be understood by those of ordinary skill in the art.

Figure 11:
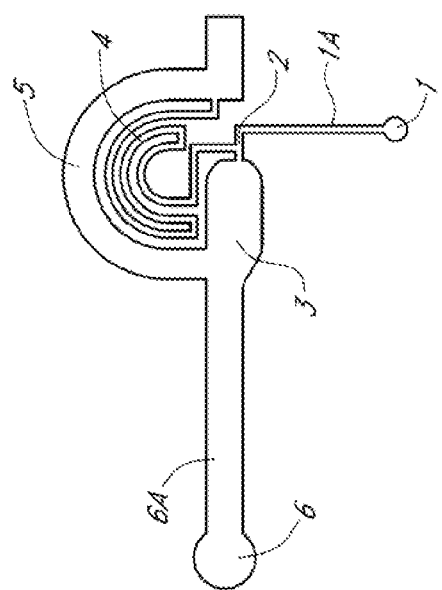
FIG. 11 provides a diagram illustrating a fluidic device containing a passive air control valve and a high resistance air valve constriction channel in which the second port is blocked.

As a non-limiting example of manual operation of a microfluidic device provided in herein, a biochemical assay may be performed by introducing a suitable amount (e.g., 0.1-5 microliters) of a blood sample from a subject into a first port of a microfluidic device (e.g., 1 or 7 in FIG. 1; 6 or 7 in FIG. 7; or 6 in FIG. 11; 1 in FIG. 13; or air valve control port (e.g., 1A in FIG. 11)), using a micro-pipettor. A user then pushes the sample into the reaction well through a fluid transport channel using the pipettor. The sample is then incubated within the reaction well to permit binding of target antigen molecules within the blood sample to the surface of the reaction well. After a suitable period of time allowing for the binding of the target antigen molecules to the surface of the reaction well, 100 ul of a wash buffer is injected into one or more ports (e.g., 1 or 7 in FIG. 1; 6 or 7 in FIG. 7; or 6 in FIG. 11; 1 or 5 in FIG. 13; 1 or 2 in FIG. 14; or air valve control port (e.g., 1A in FIG. 11)) by a user using a pipettor. Following circulation of the wash buffer through the reaction well, another reagent (e.g., an antigen-binding agent such as an antibody having specificity for the target antigen molecule) is introduced into the device through one or more ports (e.g., 1 or 7 in FIG. 1; 6 or 7 in FIG. 7; or 6 in FIG. 11; 1 or 5 in FIG. 13; 1 or 2 in FIG. 14; or air valve control port (e.g., 1A in FIG. 11)). After a suitable amount of time, another wash buffer is then introduced into the device through one or more ports (e.g., 1 or 7 in FIG. 1; 6 or 7 in FIG. 7; or 6 in FIG. 11; 1 or 5 in FIG. 13; 1 or 2 in FIG. 14; or air valve control port (e.g., 1A in FIG. 11)). Thereafter a detection reagent can be introduced into the device through one or more ports (e.g., 1 or 7 in FIG. 1; 6 or 7 in FIG. 7; or 6 in FIG. 11; 1 or 5 in FIG. 13; 1 or 2 in FIG. 14; or air valve control port (e.g., 1A in FIG. 11)), and the presence or absence of the binding agent and, therefore, the target antigen molecule of interest, in the reaction is determined. With respect to the fluidic devices such as but not limited to those illustrated in FIG. 13, secondary reagents (including wash buffer and other reagents) are typically injected via part 5 (FIG. 13). This fluidic device therefore is ideally, but not necessarily, devoid of fluid (e.g., emptied) outside the reaction well/fluidic connection channel. In some embodiments, then, after each application of a new liquid to the microfluidic device through a port in a fluidic device illustrated by FIG. 13 or 14, the fluidic device is emptied of fluids outside the reaction well and the fluidic connection channel using techniques provided herein.

In some embodiments of the fluidic systems disclosed herein, the fluidic devices and/or systems comprising the same can be used in point-of-care (POC) applications. Point-of-care testing refers to medical diagnostic testing at or near the point of care, i.e. at the time and place of patient care. This contrasts with testing that is performed wholly or in part in a medical laboratory. In POC settings, fluids or reagents can be preloaded into a cartridge separated by air plugs to allow loading of any number of fluids into reactions wells. One non-limiting example is a rapid diagnostic test, i.e. a biochemical and/or an immunoassay and/or involving nucleic acid amplification such as isothermic amplification, that detects antigens of interest. For instance, a single plug of sub-microliter sample volume can be introduced into reaction wells coated with different antibodies, for example, to identify the presence of antigen binding partners in the sample.

With reference to FIGS. 1A-1B, shown are embodiments of a fluidic device having a passive air control valve. The fluidic device consists of a first port 1, a first fluid transport channel 1A, a reaction well 2, an overflow channel 3, a fluidic connection 4, an air control valve 5, a port for the air control valve into the atmosphere 6, a second port 7, and a second fluid transport channel 7A.

In some embodiments, a plurality of fluidic devices in which at least one has a passive air control valve, are adjoined such that they are in direct fluidic communication with one another, forming a fluidic system that can be used for point of care testing or laboratory testing. In some embodiments, the fluidic devices are adjoined in series. With reference to FIG. 5, the embodiments of a fluidic system can include a first port 1 of a first fluid transport channel 1A; a second port 7 of a second fluid transport channel 7A; and a plurality of fluidic devices positioned between the first fluid transport channel 1A and the second fluid transport channel 7A wherein each fluidic device includes a first intradevice fluid transport channel 1B; a reaction well 2; an overflow channel 3; a fluidic connection 4; an air control valve 5; a port for the air control valve 6; and a second intradevice fluid transport channel 3A. In this embodiment, for each individual fluidic device in the system, the fluidic connection is in direct fluidic communication with the reaction well, the air control valve, the overflow channel, and the second intradevice fluid transport channel. Furthermore, the second intradevice fluid transport channel of each fluidic device is continuous with the first intradevice fluid transport channel of a subsequent fluidic device in the plurality of fluidic devices adjoined to one another; and the second intradevice fluid transport channel of the last fluidic device in the series is continuous with the second fluid transport channel.

With reference to FIG. 7, shown are embodiments of a fluidic device having a passive air control valve and a high resistance air flow constriction channel. The fluidic device consists of an air control valve port 1, an air control valve 1A, a fluidic connection 2, a reaction well 3, a high resistance air flow constriction channel 4, an overflow channel 5, a first port 7, a first fluid transport channel 7A, a second port 6, and a second fluid transport channel 6A.

In some embodiments, a plurality of fluidic devices in which at least one has a passive air control valve and a high resistance air valve constriction channel, are adjoined such that they are in direct fluidic communication with one another, forming a fluidic system that can be used for point of care testing or laboratory testing. In some embodiments, the fluidic devices are adjoined in series. With reference to FIG. 10, the embodiments of a fluidic system can include a first port 7 of a first fluid transport channel 7A; a second port 6 of a second fluid transport channel 6A; and a plurality of fluidic devices positioned between the first fluid transport channel 7A and the second fluid transport channel 6A wherein each fluidic device includes a first intradevice fluid transport channel 7B; a reaction well 3; a high resistance air valve constriction channel 4; an overflow channel 5; a fluidic connection 2; an air control valve 1A; a port for the air control valve 1; and a second intradevice fluid transport channel 6B. In this embodiment, the first fluid transport channel is continuous with the first intradevice fluid transport channel; the first intradevice fluid transport channel of each fluidic device is in direct fluidic communication with the reaction well and the overflow channel thereof; the fluidic connection of each fluidic device is in direct fluidic communication with the reaction well, the air control valve, and the high resistance air valve constriction channel thereof; the second intradevice fluid transport channel of each fluidic device is in direct fluidic communication with the overflow channel and the high resistance air valve constriction channel thereof; the second intradevice fluid transport channel of each fluidic device is continuous with the first intradevice fluid transport channel of a subsequent fluidic device in the plurality of fluidic devices adjoined to one another; and the second intradevice fluid transport channel of the last fluidic device in the series is continuous with the second fluid transport channel.

In some embodiments, the fluidic device has only one port of a fluid transport channel as in FIG. 11. The fluidic device consists of an air control valve port 1, an air control valve 1A, a fluidic connection 2, a reaction well 3, a high resistance air flow constriction channel 4, an overflow channel 5, a port 6, and a fluid transport channel 6A. As shown in FIG. 11, the high resistance air flow constriction channel 4 may be in direct fluidic communication with overflow channel 5 (which, in this embodiment, does not comprise a port) and fluidic connection 2.

In some embodiments, the fluidic device comprises multiple subunit fluidic devices in fluid communication with one another as illustrated in FIG. 12 (including an exemplary, non-limiting eight subunit fluidic devices). In this embodiment, described from left to right as illustrated in FIG. 12, the first subunit fluidic device comprises a first port (7) of a first fluid transport channel (7A) which is in direct fluidic communication with a second fluid transport channel (6A) and reaction well (3). In this embodiment, the end of fluid transport channel 6A opposite first fluid transport channel 7A terminates in port 6. Reaction well 3 is in direct fluidic communication with overflow channel 5 and fluidic connection 2. Fluidic connection 2 is in direct fluidic communication with air control valve 1A and high resistance air flow constriction channel 4. High resistance air flow constriction channel 4 is in direct fluidic communication with overflow channel 5. Opposite its connection with reaction 3, overflow channel 5 is in direct fluidic communication with the fluid transport channel of the second fluidic device (8A) which includes the same components as the first subunit fluidic device but not including the first fluid transport channel (e.g., not including 7A of the first fluidic device). This arrangement of parts continues through the third, fourth, fifth, sixth, and seventh subunit fluidic devices. The last subunit fluidic device, in FIG. 12 being the eighth subunit fluidic device, terminates with a sample outlet port connected to the last fluid transport channel (8A in FIG. 12). Other arrangements are also possible (e.g., more or less than eight subunit fluidic devices) as would be understood by those of ordinary skill in the art.

This disclosure describes, in some embodiments, a fluidic device comprising an air control valve (e.g., a passive air control valve) in direct fluidic communication with a fluidic connection. In some embodiments, the fluidic device further comprises an overflow channel and a reaction well connected to one another by the fluidic connection. In some embodiments, the air control valve has a geometric structure other than straight that increases hydrodynamic resistance as compared to hydrodynamic resistance provided by a geometrically straight air control valve. In some embodiments, multiple such fluidic devices may be arranged in fluid communication with one another (e.g., linked in series).

In some embodiments, this disclosure provides a fluidic device comprising a first port of a first fluid transport channel; a reaction well; an overflow channel; a fluidic connection; an air control valve (e.g., a passive air control valve); a port for the air control valve; and, a second port of a second fluid transport channel; wherein: the first fluid transport channel is in direct fluidic communication with the overflow channel and the reaction well; the overflow channel is further in direct fluidic communication with the second fluid transport channel and the fluidic connection; and, the fluidic connection is further in direct fluidic communication with the reaction well and the air control valve. In some such embodiments, the air control valve has a geometric structure other than straight that increases hydrodynamic resistance as compared to hydrodynamic resistance provided by a geometrically straight air control valve. In some embodiments, at least two such fluidic devices are adjoined to one another (e.g., in fluid communication with one another).

In some embodiments, this disclosure provides a fluidic device comprising an air control valve (e.g., a passive air control valve); a fluidic connection; a reaction well; a high resistance air valve constriction channel; an overflow channel; a first port of a first fluid transport channel; and, a second port of a second fluid transport channel; wherein: the first fluid transport channel is in direct fluidic communication with the overflow channel and the reaction well; the overflow channel is further in direct fluidic communication with the reaction well, the high resistance air valve constriction channel, and the second fluid transport channel; the reaction well is further in direct fluidic communication with the fluidic connection; the fluidic connection is further in direct fluidic communication with the high resistance air valve constriction channel and the air control valve; and, the second fluid transport channel is further in direct fluidic communication with the high resistance air valve constriction channel. In some embodiments, the fluidic device further comprises an air control valve port connected to the air control valve. In some embodiments, at least two such fluidic devices are adjoined to one another (e.g., in fluid communication with one another).

In some embodiments, this disclosure provides a fluidic device comprising an air control valve; a fluidic connection; a reaction well; a high resistance air valve constriction channel; an overflow channel; and, a port of a fluid transport channel; wherein: the fluid transport channel is in direct fluidic communication with the overflow channel and the reaction well; the overflow channel is further in direct fluidic communication with the reaction well and the high resistance air valve constriction channel; the reaction well is further in direct fluidic communication with the fluidic connection; and, the fluidic connection is further in direct communication with the high resistance air valve constriction channel and the air control valve. In some such embodiments, the fluidic device the air control valve port is connected to (e.g., in fluidic communication with) an air control valve (e.g., a passive air control valve). In preferred embodiments, the fluidic device, or at least the reaction well, is composed of hydrophobic materials. In some embodiments, the fluidic device is a millfluidic, microfluidic, nanofluidic, or picofluidic device.

In some embodiments, this disclosure provides a fluidic system comprising a first port of a first fluid transport channel; a second port of a second fluid transport channel; a plurality of fluidic devices adjoined to one another in series, each fluidic device being positioned between the first fluid transport channel and the second fluid transport channel, wherein each fluidic device comprises: a first intradevice fluid transport channel; a reaction well; an overflow channel; a fluidic connection; an air control valve (e.g., a passive air control valve); a port for the air control valve; and, a second intradevice fluid transport channel; wherein: the fluidic connection of each fluidic device is in direct fluidic communication with the reaction well, the air control valve, the overflow channel, and the second intradevice fluid transport channel thereof; the second intradevice fluid transport channel of each fluidic device is continuous with the first fluid intradevice transport channel of a subsequent fluidic device in the plurality of fluidic devices adjoined to one another; and, the second intradevice fluid transport channel of the last fluidic device in the series is continuous with the second fluid transport channel.

In some embodiments, this disclosure provides a fluidic system comprising a first port of a first fluid transport channel; a second port of a second fluid transport channel; a plurality of fluidic devices adjoined to one another in series, each fluidic device being positioned between the first fluid transport channel and the second fluid transport channel, wherein each fluidic device comprises: a first intradevice fluid transport channel; a reaction well; an overflow channel; a fluidic connection; an air control valve (e.g., a passive air control valve); a high resistance air valve constriction channel; a port for the air control valve; and, a second intradevice fluid transport channel; wherein: the first fluid transport channel is continuous with the first intradevice fluid transport channel; the first intradevice fluid transport channel of each fluidic device is in direct fluidic communication with the reaction well and the overflow channel thereof; the fluidic connection of each fluidic device is in direct fluidic communication with the reaction well, the air control valve, and the high resistance air valve constriction channel thereof; the second intradevice fluid transport channel of each fluidic device is in direct fluidic communication with the overflow channel and the high resistance air valve constriction channel thereof; the second intradevice fluid transport channel of each fluidic device is continuous with the first intradevice fluid transport channel of a subsequent fluidic device in the plurality of fluidic devices adjoined to one another; and, the second intradevice fluid transport channel of the last fluidic in the series is continuous with the second fluid transport channel.

In some embodiments, this disclosure provides a fluidic system comprising a first port of a first fluid transport channel; a second port of a second fluid transport channel; a plurality of fluidic devices adjoined to one another in series, each fluidic device being positioned between the first fluid transport channel and the second fluid transport channel, wherein each fluidic device comprises: a first intradevice fluid transport channel; a reaction well; an overflow channel; a fluidic connection; an air control valve (e.g., a passive air control valve); a high resistance air valve constriction channel; a port for the air control valve; and a second intradevice fluid transport channel; as well as a sample port and sample channel for at least one of the plurality of fluidic devices wherein: the first fluid transport channel is in direct fluidic communication with the sample channel and the first intradevice fluid transport channel of the first fluidic device; the first intradevice fluid transport channel of each fluidic device is in direct fluidic communication with the reaction well and the overflow channel thereof; the fluidic connection of each fluidic device is in direct fluidic communication with the reaction well, the air control valve, and the high resistance air valve constriction channel thereof; the second intradevice fluid transport channel of each fluidic device is in direct fluidic communication with the overflow channel and the high resistance air valve constriction channel thereof; the second intradevice fluid transport channel of each fluidic device is continuous with the first intradevice fluid transport channel of a subsequent fluidic device in the plurality of fluidic devices adjoined to one another and the first intradevice fluid transport channel and the second intradevice fluid transport channel are in direct fluidic communication with the sample channel; and, the second intradevice fluid transport channel of the last fluidic device in the series is continuous with the second fluid transport channel.

In some embodiments comprising a plurality of fluidic devices, at least one (e.g., all) of said plurality of fluidic devices has/have an air control valve with a geometric structure other than straight that increases hydrodynamic resistance as compared to hydrodynamic resistance provided by a geometrically straight air control valve. In some embodiments, each of the plurality of fluidic devices holds a fluid without contaminating fluids contained in adjoining fluidic devices. In some embodiments, the fluidic system enables operations to be performed in each fluidic device without contaminating fluid contained in adjoining fluidic devices.

In some embodiments, this disclosure provides methods of operating a fluidic device, the method comprising: a) opening a port of an air control valve, wherein the air control valve is in direct fluidic communication with a fluidic connection that connects a reaction well to a second fluid transport channel comprising a second port; b) introducing a fluid into a first port of a first fluid transport channel, wherein said fluid enters an overflow channel in direct fluidic communication with a reaction well, causing the fluid to enter the reaction well; and, c) introducing air into the first port thereby forcing excess fluid to enter the second fluid transport channel by way of the overflow channel and exit through the second port; wherein said port of the air control valve is kept open during steps a), b) and c) to allow fluid to accumulate in the fluidic connection between the reaction well and second fluid transport channel, thereby preventing fluid from escaping the reaction well; and, wherein fluid only enters the reaction well when the port of the air control valve is open to atmosphere. In some embodiments, the port of the air control valve is closed upon completion of steps a), b) and c). In other embodiments, excess fluid is aspirated back into the fluid introduction device.

In some embodiments, this disclosure provides methods for manipulating a first fluid stored in a reaction well of a fluidic device, wherein said fluidic device comprises an air control valve with a port, a first fluid transport channel having a first port, and a second fluid transport channel having a second port, said method comprising: a) opening the port of the air control valve, wherein the air control valve is in direct fluidic communication with a fluidic connection that connects a reaction well to the second fluid transport channel; and, b) introducing a second fluid into the second port, wherein said second fluid passes through the second fluid transport channel and the fluidic connection into the reaction well, resulting in a mixture of the first and second fluids in the reaction well. In some such embodiments, excess fluid flows out of the first port in direct fluidic communication with the reaction well. In some embodiments, the second fluid is a sample, buffer, water, or wash solution. In some embodiments, the second fluid is introduced at a flow rate and volume that causes dilution of the first fluid in the reaction well. In some embodiments, the second fluid is introduced at a flow rate and volume that causes the first fluid to be washed out of the reaction well. In some embodiments, the second fluid is trapped inside the reaction well with the first fluid to conduct an assay. In some embodiments, the assay is a biochemical and/or an immunoassay and/or involves isothermal amplification. In some embodiments, the assay is colorimetric or fluorescence-based. In some embodiments, such methods further comprise detection of assay results using a plate reader or camera.

In some embodiments, this disclosure provides methods for operating a fluidic device, wherein said fluidic device comprises an air control valve with a port and a fluid transport channel having a port, said method comprising: a) introducing a fluid into a port of an air control valve, wherein said air control valve is in direct fluidic communication with a fluidic connection, which is further in direct fluidic communication with a high resistance air valve constriction channel and a reaction well and wherein the fluid enters the reaction well; and, b) introducing air into the port of the air control valve, wherein said air enters the high resistance air valve constriction channel, which is in direct fluidic communication with an overflow channel which is in direct fluidic communication with the fluid transport channel, causing excess fluid to be pushed through the overflow channel and the fluid transport channel and out the port of the fluid transport channel. In other embodiments, excess fluid is aspirated back into the fluid introduction device.

In some embodiments, this disclosure provides methods for manipulating a first fluid stored in a reaction well of a fluidic device having a port of an air control valve and a port of a fluid transport channel, said method comprising introducing a second fluid into a port of an air control valve, wherein said air control valve is in direct fluidic communication with a fluidic connection which is in direct fluidic communication with a reaction well and a high resistance air valve constriction channel and wherein said second fluid enters the reaction well, coalescing with the first fluid.

In some embodiments, this disclosure provides methods for introducing fluids into any one or more fluidic devices of a fluidic system wherein said system comprises a first port of a first fluid transport channel; multiple fluidic devices arranged in series, and a second port of a second fluid transport channel; wherein the fluidic devices are positioned between the first port and the second port and in direct fluidic communication with another and wherein at least one of the fluidic devices comprises an air control valve that can be opened or closed using an air control valve port; wherein the method comprises: a) introducing a first fluid into a second port, wherein said first fluid enters a reaction well of a fluidic device for which the associated air control valve is open; b) introducing a second fluid, different from the first fluid, into the second port, wherein said second fluid enters a reaction well of a fluidic device for which the associated air control valve is open, said fluidic devices being the same or different as those of step a); and, c) optionally repeating steps a) and b), using fluids the same or different from the first and second fluids. In some such embodiments, the first and second fluids are separated by one or more air plugs.

In some embodiments, this disclosure provides methods for introducing fluids into a fluidic device comprising a reaction well in direct fluidic communication with an air control valve with a port and a second port of a second fluid transport channel; the method comprising introducing a first fluid into the reaction well through the air control valve port while the second port is blocked. In some such embodiments, the reaction well is further in direct fluidic communication with a first fluid transport channel having a first port, the method further comprising unblocking the second port and introducing a second fluid into the reaction well through the first port, thereby diluting the first fluid in the reaction well. In some embodiments, two or more fluidic devices are connected in series. In some embodiments, additional fluids, different from the first fluid and the same or different from the second fluid, are introduced through the first port separated from one another by air plugs. In some embodiments, said fluid and/or air is introduced using a pipette or syringe pump. In some embodiments, the opening or closing of the port of the air control valve is automated.

In some embodiments, this disclosure provides a series of fluidic devices connected to one another (e.g., as shown in FIGS. 5 and 6). In some embodiments, different fluids can be introduced into the second port of a series of fluidic devices by introducing a fluid plug followed by air, which pushes the fluid into the reaction wells for which the associated air control valve ports are open, thereby selectively filling reaction wells with the fluid. In such methods, reaction wells with closed air control valve ports do not fill with the fluid. Thus, in some embodiments, different fluids can be introduced through a second port to a series of connected fluidic devices, or a subset thereof. In some embodiments, this can be accomplished by opening air control valve port of the first reaction well (keeping those of the of the reaction wells of the other devices in the series closed) and introducing first fluid into the second port followed by air or aspirating the fluid back into the fluid introduction device, causing the first fluid to enter the reaction well of the first fluidic device in the series (and no other reaction wells), and then closing the air control valve port for that reaction well. The air control valve port of the second reaction well in the series can then opened (keeping those of other reaction wells in the series closed), and a second fluid can be introduced into the second port of the second reaction well followed by passing air or aspirating the fluid back into the fluid introduction device, causing the second fluid to enter reaction well of the second fluidic device in the series (and no other reaction wells), and then closing the air control valve port for that reaction well. Subsequent reaction wells in the series can then sequentially filled using the same process for each respective reaction well. In such embodiments, substantial mixing of the first and second fluids does not occur. In some embodiments, different fluids could be trapped in each respective well using these methods.

In some embodiments, some of the reaction wells may be filled with the same fluids and some with different fluids. For instance, in some embodiments, such as in a device comprising eight fluidic devices connected to one another, the air control valve ports may be opened for reaction wells 1, 3, 5 and 7, and a first fluid introduced into the second port followed by passing air or aspirating the fluid back into the fluid introduction device, causing that fluid to enter reaction wells 1, 3, 5 and 7 but not reaction wells 2, 4, 6 and 8. The air control valve ports for reaction wells 1, 3, 5 and 7 can then be closed and the air control valve ports for reaction wells 2, 4, 6 and 8 opened. A second fluid can then be introduced into the second port followed by passing air or aspirating the fluid back into the fluid introduction device, thereby causing reaction wells 2, 4, 6 and 8 to fill with the second fluid. In such embodiments, substantial mixing of the first and second fluids does not occur.

In some embodiments, this disclosure provides fluidics devices linked in series (e.g., as exemplified in FIGS. 5 and 6) such that the same may be used in point of care applications (e.g., immunoassays). In some embodiments, fluids and/or reagents can be preloaded into a cartridge (e.g., a hydrophobic tubing, pipette tip or cartridge) separated by air plugs to allow loading of any number of fluids into the reaction wells. For example, with immunoassays, a sample can be introduced into a common port, either the first port or the second port, allowing it to be introduced into reaction wells, each coated with different antibodies. Detection of binding reactions between one or more components of such sample and the antibodies may then be detected using standard techniques. Other embodiments are also contemplated by this disclosure, as would be understood by those of ordinary skill in the art.

In some embodiments, this disclosure provides a fluidic device comprising: a first port; a first fluid transport channel in fluid connection with the first port, a reaction well, and, an overflow channel; a second fluid transport channel in fluid communication with the overflow channel; a fluidic connection channel comprised of a hydrophobic material and being in fluid communication with the reaction well and the second fluid transport channel; and, a second port in fluid communication with the second fluid transport channel. In some embodiments, this disclosure provides a fluidic device comprising a first port in direct fluidic communication with a first fluid transport channel that is also in direct fluidic communication with a reaction well and an overflow channel. In some embodiments, the fluidic device also comprises a second fluid transport channel in direct fluid communication at one end with the overflow channel and with a second port at the other end. In some embodiments, the second fluid transport channel is also in direct fluidic communication with a fluidic connection channel (that may be comprised of a hydrophobic material) which is in direct fluid communication with the reaction well. An exemplary embodiment of such a fluidic device is illustrated in FIG. 13.

In some embodiments, this fluidic device comprises a device such as that illustrated in FIG. 13 and further comprises a fluidic mixer comprising a serpentine mixing channel in fluidic communication with the second fluid transport channel; a third fluid transport channel in fluidic communication with the serpentine mixing channel, the third fluid transport channel optionally comprising a mixing window; a fourth fluid transport channel in fluid communication with a second port; a fifth fluid transport channel in fluid communication with a third port; wherein the fourth and fifth transport channels are in fluidic communication with one another distal from their respective ports, and further in fluidic communication with the third fluid transport channel. In some embodiments, the fluidic mixer comprises a serpentine mixing channel that at one end is in fluidic communication with a fluid transport channel of a fluidic device (such as the second fluid transport channel of the fluidic device illustrated in FIG. 13). In some embodiments, the fluidic mixer comprises a third fluid transport channel in direct fluidic communication with the end of the serpentine mixing channel opposite the fluid channel of the device such as that illustrated in FIG. 13, where the third fluid transport channel optionally further comprising a mixing window. Opposite the end of the third fluid transport channel in direct fluidic communication with the serpentine mixing channel, the third fluid transport channel is in direct fluidic communication with: a fourth fluid transport channel that is in direct fluid communication with a port; and a fifth fluid transport channel in direct fluid communication with a port; where the fourth and fifth transport channels are in direct fluidic communication with one another distal from their respective ports. An exemplary embodiment of such a fluidic device is illustrated in FIG. 14.

In some embodiments, a fluidic device arranged essentially as illustrated in FIG. 13 and/or FIG. 14 may be designed and constructed with reference to the relative diameters (widths) of the various fluid transport channels, overflow channel(s), the reaction well(s), and/or the serpentine mixing channel(s). In certain illustrative embodiments such fluidic device does not include a passive air control valve. For instance, the various fluid transport channels may be of approximately the same diameter (and/or width) or within, e.g., 10-15% of one another. In some embodiments, the diameter of the reaction well is approximately four times that of the fluid connection channel, which is itself approximately 20-33% the diameter of the second fluid transport channel (e.g., 5A in FIG. 13). In some embodiments, such as in the fluidic device of FIG. 14, the fourth and fifth fluid transport channels, and in some embodiments, the third fluid transport channel, may be of approximately the same diameter. In some embodiments, the third fluid transport channel may be of a smaller diameter than the fourth and/or fifth fluid transport channel(s), or the parts of each forming the junction at which these parts meet may be of the same diameter which may change (e.g., becoming larger or smaller) in the direction in which the fluid flows through the third fluid transport channel toward the serpentine mixing channel. The third fluid transport channel and the serpentine mixing channel may also be of the same diameter, or the third fluid transport channel may be of a smaller (in preferred embodiments) or larger diameter than the serpentine mixing channel. As the serpentine mixing channel comes into fluidic communication with a device such as that provided in FIG. 13, e.g., at the second fluid transport channel (5A in FIG. 13), the diameters may be approximately the same (e.g., at the junction thereof), or the diameter of the second fluid transport channel (5A in FIG. 13) may be greater than that of the serpentine mixing channel. Other embodiments may incorporate different diameters as long as the flow of fluid through the device is maintained, as may be determined by those of ordinary skill in the art using standard design and manufacturing techniques.

In some such embodiments, especially with respect to, but not limited to, those illustrated in FIGS. 13 and 14, one or more of the following features is present: the first fluid transport channel comprises a diameter distal to the first port of about 2-8 times, 3-5 times, or in illustrative embodiments four times its diameter proximal to the first port; the diameter of the reaction well is 1.5-4 times, or in illustrative embodiments, approximately twice the diameter of the fluid transport channel proximal to the first port; the length of the reaction well is ⅕ to the same length as, and in illustrative embodiments, approximately one third the length of, the first fluid transport channel; the diameter of the overflow channel is 0.3 to 0.8 or in illustrative embodiments, or approximately 0.4 to 0.75 the diameter of the first fluid transport channel distal to the first port; the fluidic device is comprised of PDMS wherein the diameter of the overflow channel is 0.4 to 0.8 or in illustrative embodiments, approximately 0.6 the diameter of the first fluid transport channel distal to the first port; the device is comprised of COC wherein the diameter of the overflow channel is 0.3 to 0.7 times the diameter of, and in illustrative embodiments, approximately 0.5 the diameter of the first fluid transport channel distal to the first port; the length of the overflow channel is at least 0.5 to 1.5 times, or in illustrative embodiments about 0.9 times the length of the first fluid transport channel; the second fluid transport channel comprises a diameter distal to the second port of 1.5 to 3 or in illustrative embodiments about two times its diameter proximal to the second port; and/or, the length of the second fluid transport channel is 0.5 to 2 times, or in illustrative embodiments approximately equivalent to approximately 1.25 times the length of the first fluid transport channel.

In some embodiments, a fluidic device provided herein (e.g., that illustrated in FIG. 1 or FIG. 13) is in fluidic communication with a fluidic mixer such that two, three, four or more solutions can be mixed before being introduced into the fluidic device. In an illustrative embodiment, the fluidic mixture comprises a serpentine mixing channel in fluidic communication with the second fluid transport channel (7A) of a device such as that of FIG. 1 or with the second fluid transport channel of a device such as that of FIG. 13; a third fluid transport channel in fluidic communication with the serpentine mixing channel, the third fluid transport channel optionally comprising a mixing window; a fourth fluid transport channel in fluid communication with a second port; a fifth fluid transport channel in fluid communication with a third port; wherein the fourth and fifth transport channels are in fluidic communication with one another distal from their respective ports, and further in fluidic communication with the third fluid transport channel. An exemplary embodiment of such a fluidic device is illustrated in FIG. 14. In some such embodiments, one or more of the following features is present: a fluid within the mixing window is visible to a user; the serpentine mixing channel has a length of approximately 15 to approximately 25 times (e.g., 90.1 mm vs. 4.6 mm in an embodiment of the fluidic mixer of FIG. 14; e.g., approximately 20 times) the length of the third fluid transport channel; the serpentine mixing channel has a diameter of approximately twice the diameter of the third fluid transport channel; the fourth and fifth fluid transport channels are of approximately the same diameter and length; the length of the third fluid transport channel is approximately the same length of the fourth and/or fifth fluid transport channels; and/or, the diameter of the third fluid transport channel is approximately 0.4 the diameter of the fourth and/or fifth fluid transport channels. However, it is noted that the ratio of the diameter of the third fluid transport channel relative to the diameter of the fourth and/or fifth fluid transport channels is flexible and, e.g., the 0.4 value is only a preferred ratio. It is noted that, in some embodiments, when differences in diameters are discussed, it is the diameter at the junction of channels and/or reaction well(s) being discussed. It is also noted that the diameters of two parts that are in direct fluidic communication with one another will typically be approximately the same (e.g., the third, fourth and fifth fluid transport channels illustrated in FIG. 14). While the serpentine mixing channel is typically arranged as shown in FIG. 14, this is not necessarily so since, in some embodiments, the serpentine mixing channel can comprise or be configured in a form other than a straight channel, as long as it creates turbulence and therefore mixing of liquids that pass through it, such as where the serpentine channel comprises one or more complete serpentine coils (e.g., between two to twelve serpentine coils, alone or combined with straight channels).

In some embodiments of the devices provided here, especially with respect to, but not limited to, those illustrated in FIGS. 13 and 14, the diameter of the fluidic connection channel is any of: approximately 0.1 to 0.4 or in illustrative embodiments, preferably approximately 0.15 to approximately 0.30, the diameter of the reaction well; approximately 150-225 mu, optionally wherein the fluidic connection channel is comprised of PDMS; approximately 175-200 mu; approximately 160-215 mu, optionally wherein the fluidic connection channel is comprised of COC; approximately 0.15 to approximately 0.30 the diameter of the reaction well; approximately 0.2-0.25 the diameter of the reaction well; approximately 0.1-0.2 the diameter of the second fluid transport channel at the point at which the fluidic connection channel and the second fluid transport channel contact one another; and/or approximately 0.1-0.25 the length of the reaction well. In some embodiments of the devices described above such as those illustrated in FIGS. 13 and 14, the length of the fluidic connection channel is approximately 0.1-0.175 the length of the reaction well; approximately 0.125-0.150 the length of the reaction well; approximately 0.1-0.175, optionally 0.125-0.150, the length of the reaction well where the fluidic connection channel is comprised of PDMS; and/or approximately 0.11-0.13 the length of the reaction well where the fluidic connection channel is comprised of COC.

In certain embodiments provided herein, as a non-limiting example, the fluidic device illustrated in FIG. 13, the relative diameters of channels within the device are one or more, or in illustrative embodiments all, of the following: the first fluid transport channel comprises a diameter distal to the first port of about 2-8 times, 3-5 times, or in illustrative embodiments four times its diameter proximal to the first port; the diameter of the reaction well is 1.5-4 times, or in illustrative embodiments, approximately twice the diameter of the fluid transport channel proximal to the first port; the diameter of the overflow channel is 0.3 to 0.8 times or in illustrative embodiments, or approximately 0.4 to 0.75 times the diameter of the first fluid transport channel distal to the first port; the second fluid transport channel comprises a diameter distal to the second port of 1.5 to 3 times or in illustrative embodiments about two times its diameter proximal to the second port; the diameter of the fluidic connection channel is any of: approximately 0.1 to 0.4 times or in illustrative embodiments, preferably approximately 0.15 to approximately 0.30 times the diameter of the reaction well; and the fluid connection channel is 20-33% the diameter of the second fluid transport channel.

In certain embodiments provided herein, which can include those provide in the paragraph immediately above, during filling of the fluidic device, or in some embodiments when the overflow channel is partially filled with fluid and the reaction well is at least 75%, 80%, 85%, 90%, or 95% filled with fluid, and in illustrative embodiments 80% filled with fluid, or in some embodiments wherein the device comprises effective relative dimensions of channels and the reaction well(s) and/or effective relative dimensions at the junctions of channels and at the junctions of the reaction well(s) with adjacent channels:
a) the ratio of capillary pressures within the fluidic connection channel and the first overflow channel is approximately 1.3 to 1.8;
b) the ratio of capillary pressures within fluidic connection channel and the first overflow channel is approximately 1.438 to 1.726, optionally wherein the fluidic device is comprised of PDMS;
c) the ratio of capillary pressures within fluidic connection channel and the first overflow channel is approximately 1.510-1.603, optionally wherein the fluidic device is comprised of PDMS; or
d) the ratio of capillary pressures within fluidic connection channel and the first overflow channel is approximately 1.426 to 1.628, optionally wherein the fluidic device is comprised of COC.

Capillary pressure is derived from the fluid air interface, such that when the channels of the device are full of fluid, the ratio of capillary pressures is not as important. Thus, capillary pressure is most important when the device comprises and/or is full of air, and fluid is being inputted into the device. In some embodiments of the devices provided herein, then, especially with respect to, but not limited to, those illustrated in FIGS. 13 and 14, as the device is at least partially filled with fluid (e.g., such that when the overflow channel is partially filled with fluid and the reaction well is (or is approximately) at least 75%, 80%, 85%, 90%, or 95% filled with fluid, and in illustrative embodiments 80% filled with fluid), the ratio of capillary pressures within fluidic connection channel and the first overflow channel is preferably approximately 1.3 to 1.8. In some embodiments, during filling of the device with fluid, the ratio of capillary pressures within fluidic connection channel and the first overflow channel is approximately 1.438 to 1.726 (optionally wherein the fluidic device is comprised of PDMS). In some embodiments, during filling of the device with fluid, the ratio of capillary pressures within fluidic connection channel and the first overflow channel is approximately 1.510-1.603 (optionally wherein the fluidic device is comprised of PDMS). In some embodiments, during filling of the device with fluid, the ratio of capillary pressures within fluidic connection channel and the first overflow channel is approximately 1.426 to 1.628 (optionally wherein the fluidic device is comprised of COC). In some embodiments, upon filling of the device with fluid, or when the device is completely filled with fluid, the fluidic connection channel is completely filled with fluid and/or does not comprise air. In some embodiments, a fluid air interface is present at an end of the fluidic connection channel distal to the reaction well.

In some embodiments, this disclosure provides methods for filling a reaction well using a microfluidic device provided herein, such as a mircofluidic device of FIG. 1 or FIG. 13. Accordingly, In another aspect, provided herein is a method for loading a sample into a reaction well of a fluidic device, the method comprising: A) introducing the sample through a first port of a microfluidic device into a first fluid transport channel to fill the reaction well, an overflow channel, a second fluid transport channel, and a fluidic connnection channel, wherein the reaction well and the overflow channel are in fluid connection with the first fluid transport channel, the overflow channel is in fluid communication with the second fluid transport channel at an end opposite the end that is in fluid communication with the first fluid transport channel, and wherein the fluidic connection channel is in fluid communication with the reaction well and the second fluid transport channel, and wherein the second fluidic channel is in fluid communication with a second port; and, B) either applying negative pressure from the first port (e.g. part 1 of FIG. 13) or passing air into the second port (e.g. part 5 o f FIG. 13), to remove the sample from the overflow channel, the first fluid transport channel and the second fluid transport channel, wherein the sample is retained in the reaction well and typically in the fluidic connection channel as well. When using a fluidic device such as but not limited to that illustrated by FIG. 13, rinsing and loading of a secondary reagent is typically accomplished from the second port (part 5 in FIG. 13). In most embodiments, the reaction well cannot be washed or have its contents replaced from fluid from the first port (part 1 in FIG. 13) and this must be accomplished using the second port (part 5 in FIG. 13). A solution such as wash buffer or a secondary reagent can be loaded into the reaction well from the first port (part 1 in FIG. 13), but that is typically only where in the fist step where the reaction well is empty. If the reaction well is full of fluid (i.e., outside the first step of the device usage), then fluid must be applied from the second port (part 5 in FIG. 13). In some embodiments, the method can include a step to replace the contents of the reaction well and the fluidic connection channel. For example by injecting a solution through the second port (e.g., 5 in FIG. 13) until the contents of the microfluidic device are filled with the second fluid and optionally, some second fluid flows out the first port (e.g., 1 in FIG. 13). In other embodiments, the method for loading the sample can be repeated with another solution such as a wash buffer, after the sample is loaded into the reaction well and removed from the microfluidic device other than the reaction well and the fluidic connection channel, to exchange the sample within the reaction well and fluidic connection channel with the other solution.

Microfluidic devices provided herein are typically constructed such that when the sample is removed from the microfluidic device as provided in step B above, it remains in the reaction well and typically the fluidic connection channel as well. Accordingly, illustrative microfluidic devices provided herein are constructed such that either i) the overflow channel has an effective composition and dimensions, the second fluid transport channel has an effective composition and dimensions, and the fluidic connection channel has an effective composition and dimensions, to provide appropriate capillary pressure ratios to retain the sample in the reaction well and typically the fluidic connection channel as well, while removing the sample from other channels of the microfluidic device; or ii) the fluidic connection channel is in fluid communication with the reaction well and an air control valve that is opened and closed in such a manner so as to achieve this result, as provided herein.

As explained in Example 9 herein, the fluidic device illustrated in FIG. 13 has two ports available for fluid entry or exit (1 and 5). In a first step of using this fluidic device in an exemplary embodiment, fluid is introduced into the fluidic device through the first port into the first fluid transport channel, where it begins to fill both the reaction well and the overflow channel, based in large part on the ratio of hydrodynamic resistance between these structures (the hydrodynamic resistance ratio). Fluid completely fills the reaction well before the overflow channel is full. After the reaction well is full, fluid begins to enter the fluidic connection channel, while fluid in the overflow channel continues to advance. Fluid fills the fluidic connection channel and continues around the overflow channel until both fluid streams meet. Fluid then begins to enter the second fluid transport channel. At this point, first port (1 in FIG. 13); a first fluid transport channel (1A in FIG. 13); a reaction well (2 in FIG. 13); an overflow channel (3 in FIG. 13); a fluidic connection channel (4 in FIG. 13); are each entirely full of fluid. In the second step, at the initiation of which fluid is trapped solely in the reaction well and the connection channel, negative pressure is applied from the first port. Fluid retreats from the second transport channel in a direction opposite to its loading direction. As fluid recedes to the junction between the fluid connection channel and the overflow channel, fluid passes solely through the overflow channel (e.g., the fluid effectively "chooses" this channel). The smaller width of the fluid connection channel in comparison to the overflow channel, as provided in further detailed embodiments herein, produces a much stronger fluid-air interface, which prevents any fluidic recession through the connection channel or the reaction well. As fluid retreats around the overflow channel, it passes by the entrance to the reaction well and continues through the first fluid transport channel, leaving a fluid air interface at the opening of the reaction well. All excess fluid is removed from the first fluid transport channel and the first port, leaving fluid trapped only in the reaction well and fluid connection channel. In the third step, to partially or fully replace the contents of the reaction well and fluid connection bridge with a new fluid, the second fluid port is used. Fluid enters through the second fluid port via applied pressure and continues through the second fluid transport channel. As fluid reaches the junction between the fluid connection channel and the overflow channel, fluid continues through both paths. Fluid begins to push the fluid housed in the fluid connection bridge and begins to pass around the overflow channel. This process continues; fluid continues to move around the overflow channel (e.g., "bridge") and continues to push fluid out of the fluid connection channel and the reaction well. Eventually, fluid from the overflow channel combines with fluid emerging from the opening of the reaction well. This combination of fluid continues through the first fluid transport channel and out of the first fluid port. At this point, the entire fluidic device is full of fluid. As more fluid is applied, the contents of the fluid connection bridge and reaction well are completely replaced by the new fluid. To "re-trap" this new fluid in the fluid connection bridge and reaction well, air is applied via applied positive pressure following the fluid from the second port (2 in FIG. 13). Similar to the phenomena described earlier, this air forces fluid around the overflow channel as opposed to through the fluid connection channel and reaction well (due to the strong fluid-air interface at the opening of the fluid connection channel). Fluid is continually driven around the overflow channel and through the first fluid channel and removed via the first fluid port. This leaves the new fluid only trapped in the fluidic connection channel and the reaction well.

When used in conjunction with the fluidic mixer (e.g., as illustrated in FIG. 14), two or more different fluids may be introduced into the fluidic mixer using the second and third ports connected to the fourth and fifth fluid transport channels. The fluids then enter the third fluid transport channel (optionally comprising the window) and then enters the serpentine mixing channel. The fluids are mixed within the third fluid transport channel, and especially the serpentine mixing channel, and then migrates into an attached fluidic device, such as that illustrated in FIG. 13 (which has already been loaded with fluid and/or cells (e.g., into the reaction well)). Fluids may be mixed in the fluidic mixer in equal parts (e.g., a 50/50 mixture) and/or unequal parts, by introducing equivalent or unequivalent amounts through the ports of the fluidic mixer, and/or introducing such fluids at different flow rates such that a greater amount of one fluid with respect to another fluid enters the third fluid transport channel and then the serpentine mixing channel, thereby producing a mixture comprising more of one fluid as compared to the other (e.g., and a great concentration of one active agent over another). In addition, multiple fluids or mixtures of fluids may be introduced into the fluidic mixer in series such that the fluidic device adjoined to the fluidic mixture (e.g., 6) receives different fluids and/or mixtures over time. Additional fluids, washing fluids, and the like may be loaded into and removed from the attached fluidic device, such as that illustrated in FIG. 13 (6 in FIG. 14), as described herein (e.g., using negative and/or positive pressures and the first port illustrated in FIG. 13).

In some embodiments, this disclosure provides methods for analysing the effect of a test compound on a cell population using the fluidic devices described herein. In such a method, a population of cells is introduced into a reaction well of a microfluidic device provided herein (e.g., that illustrated in FIG. 13 or shown as part 6 in FIG. 14) using steps for loading a sample into a reaction well provided herein. Next, the contents of the microfluidic device other than the reaction well and a fluidic connection channel in fluidic connection with the reaction well, are removed from the microfluidic device using steps provided herein. The cells are then incubated in the reaction well such that they adhere to a surface of the reaction well, such as by pre-coating the reaction well with poly-L lysine, or another composition known in the art for promoting cell adhesion. Next, a solution comprising a test compound is introduced into the microfluidic device using steps provided herein, such that the solution comprising the test compound enters the reaction well and replaces the fluid contents therein. The contents of the microfluidic device other than the reaction well and the fluidic connection channel are then removed using steps provided herein. The solution comprising the test compound is then incubated in the reaction well with the cells adhered to a surface therein. A solution is then introduced into the microfluidic device to remove the solution comprising the test compound from the reaction well, which can be collected and analysed to identify, for example, biomarkers that are secreted by the cell population in response to exposure to the test compound.

Some embodiments of the method for analysing provided immediately above, can utilize a microfluidic device herein that further comprises an upstream fluidic mixer component, for example as provided in FIG. 14. As such, the methods can comprise introducing a first solution comprising a test compound and a second solution through a first and second port into the upstream fluidic mixer component, to mix the first solution comprising the test compound with the second solution to form a mixed solution comprising the test compound. This mixed solution comprising the test compound can then be introduced into the microfluidic device as provided immediately above through a channel that connects the upstream fluidic mixer component to the second fluid transport channel. In some embodiments, the method can be a dynamic cell analysis method that include real-time adjustments of a concentration of the test compound that is accomplished, for example, by changing the flow rate of the first solution comprising the test compound and/or the second solution, and continuous collecting of output from the port on the opposite end of the flow path from the ports into which the first solution comprising the test compound is introduced into the fluidic mixer component. The collected output can then be analysed, for example for the presence and optionally amount of one or more biomarkers.

Unless otherwise indicated, the terms and phrases used herein are to be understood as the same would be understood by one of ordinary skill in the art. For instance, terms and phrases used herein can be used consistent with the definition provided by a standard dictionary such as, for example, the Tenth Edition of Merriam Webster's Collegiate Dictionary (1997). The terms "about", "approximately", and the like, when preceding a list of numerical values or range, refer to each individual value in the list or range independently as if each individual value in the list or range was immediately preceded by that term. The values to which the same refer are exactly, close to, or similar thereto (e.g., within about one to about 10 percent of one another). Ranges can be expressed herein as from about one particular value, and/or to about another particular value. When such a range is expressed, another aspect includes from the one particular value and/or to the other particular value. Similarly, when values are expressed as approximations, by use of the antecedent about or approximately, it will be understood that the particular value forms another aspect. It will be further understood that the endpoints of each of the ranges are significant both in relation to the other endpoint, and independently of the other endpoint. Ranges (e.g., 90-100%) are meant to include the range per se as well as each independent value within the range as if each value was individually listed. All references cited within this disclosure are hereby incorporated by reference into this application in their entirety. A skilled artisan will appreciate that where the specification provides an approximate value or range, the exact value or range is within the scope of the current specification as well.

Certain embodiments are further disclosed in the following examples. These embodiments are provided as examples only and are not intended to limit the scope of the claims in any way.

EXAMPLES

Example 1

Operation of a Fluidic Device Having a Passive Air Control Valve

A fluid was introduced via pipette into the first port (1) of a fluidic device manufactured with hydrophobic materials and having a first port (1) of a first fluid transport channel (1A), a reaction well (2), an overflow channel (3), a fluidic connection (4), an air control valve (5), a port for the air control valve into the atmosphere (6), and a second port (7) of a second fluid transport channel (7A) (FIGS. 1A and 1B), with the port for the air control valve in the open condition. The fluid entered the overflow channel (3) as shown in FIG. 2B, thereby increasing hydrodynamic resistance in the overflow channel and causing the fluid to fill the reaction well (FIG. 2C). The open port of the air control valve allowed fluid to form a fluidic connection (4); however, fluid was prevented from entering the air control valve (5) by surface tension forces and hydrodynamic resistance. Air was then introduced into the first port (1), forcing excess fluid through the overflow channel (3) and out the second port (7) (FIG. 2D). Once the fluid was trapped in the reaction well, the port of the air control valve (6), was closed.

Example 2

Figure 3A:
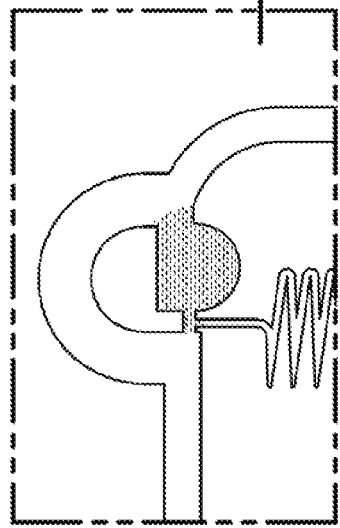
FIGS. 3A-3E show a series of schematic representations of manipulation of a stored droplet (FIG. 3A) via introduction of a second fluid through the second port. The second fluid passes through the fluidic connection from the second fluid transport channel (FIG. 3B) into the reaction well where the stored droplet and the second fluid coalesce (FIG. 3C), resulting in a diluted sample (FIGS. 3D and 3E). Excess fluid exits through the first port (FIG. 3C).
Figure 3B:
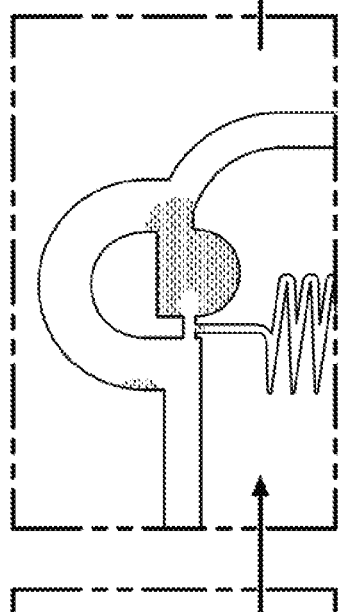
Figure 3C:
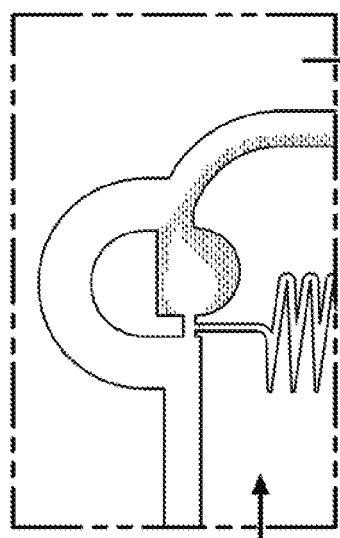
Figure 3D:
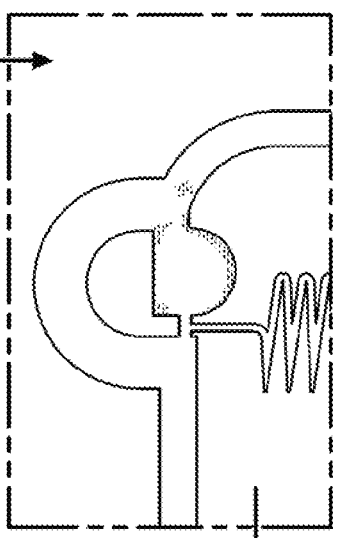
Figure 3E:
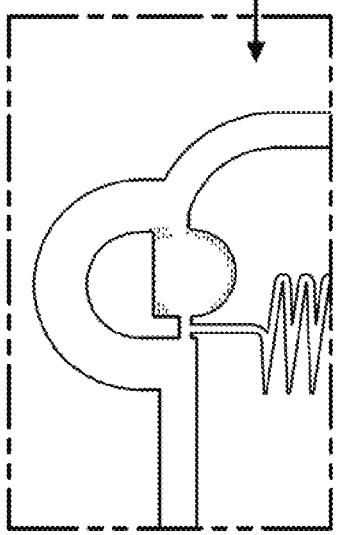

Dilution or Washing Out of Fluid Held in a Fluidic Device Having a Passive Air Control Valve The reaction well of a fluidic device disclosed in Example 1 held a fluid as shown in FIG. 3A. The port of the air control valve was opened, and a washing buffer was introduced into the second port (7) and passed through the fluidic connection (4) into the reaction well, diluting the fluid and pushing excess fluid out the first port (1) (FIGS. 3B-3E).

The first port and the second port can be used interchangeably for fluid introduction or removal of excess fluid. Furthermore, by increasing the flow rate and volume of the washing buffer, the washing buffer can be used to completely wash the fluid out of the reaction well.

Example 3

Immunoassays

A fluid sample containing no clenbuterol ("Negative sample") and a fluid sample containing 8.1 ng/mL of clenbuterol ("Clenbuterol sample") each were added to a fluidic device coated with anti-Clenbuterol antibody of Example 1 (FIG. 4A) using the method disclosed in Example 1. A colorimetric ELISA (Clenbuterol ELISA kit, Neogen, Lexington, Ky., USA) was performed, and either the Ultra TMB substrate (chromogenic) or the QuantaBlu™ substrate (fluorogenic) was used for detection. The different reagents, i.e. the antibody solution, washing buffer, the enzyme conjugate, the Ultra TMB substrate or the QuantaBlu™ substrate, and the stop solution, were added to the reaction well according to the protocol set forth in the Clenbuterol ELISA kit. After the addition of each reagent, the flow direction was reversed so that the next reagent could be trapped in the reaction well for its respective role in the ELISA (Examples 1 and 2). The port for the air control valve was kept open for each step to allow fluid to enter the reaction well. Thus, during the initial filling step, the port valve is kept open but it does not need to remain open thereafter. Upon completion of the ELISA assay, the reaction wells were read using a camera (FIG. 4A) or a plate reader (FIG. 4B).

Figure 4A:
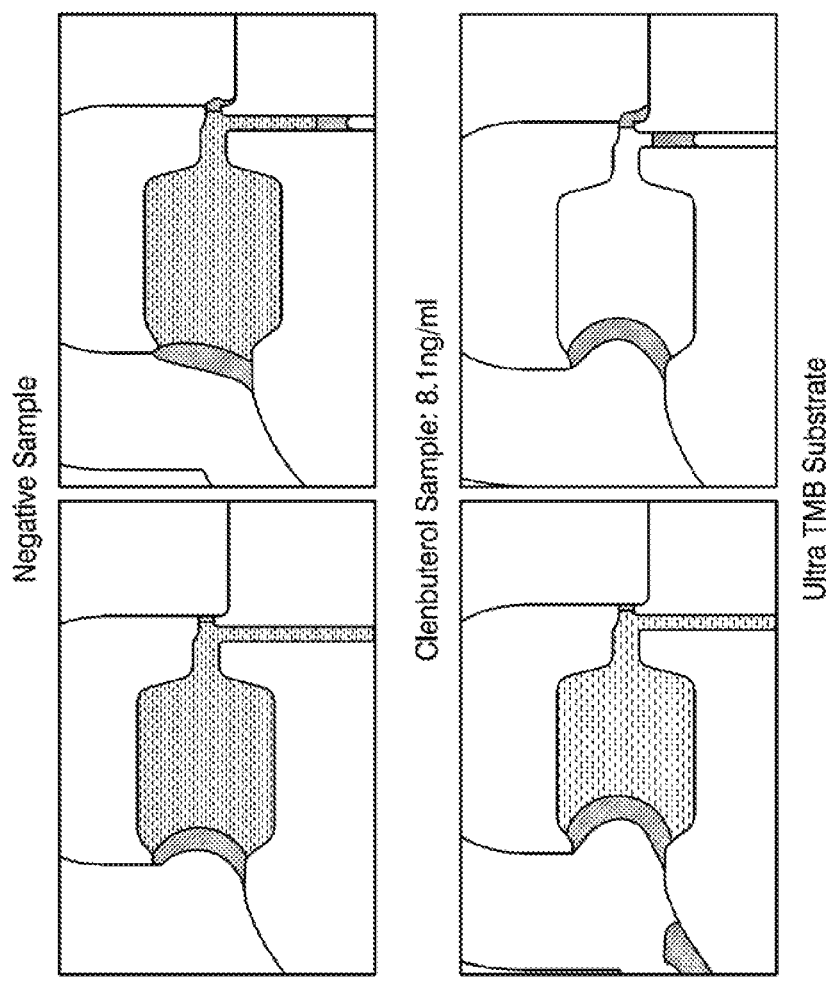
FIGS. 4A and 4B demonstrate the results of an ELISA performed using a fluidic device containing a passive air control valve.
Figure 4B:
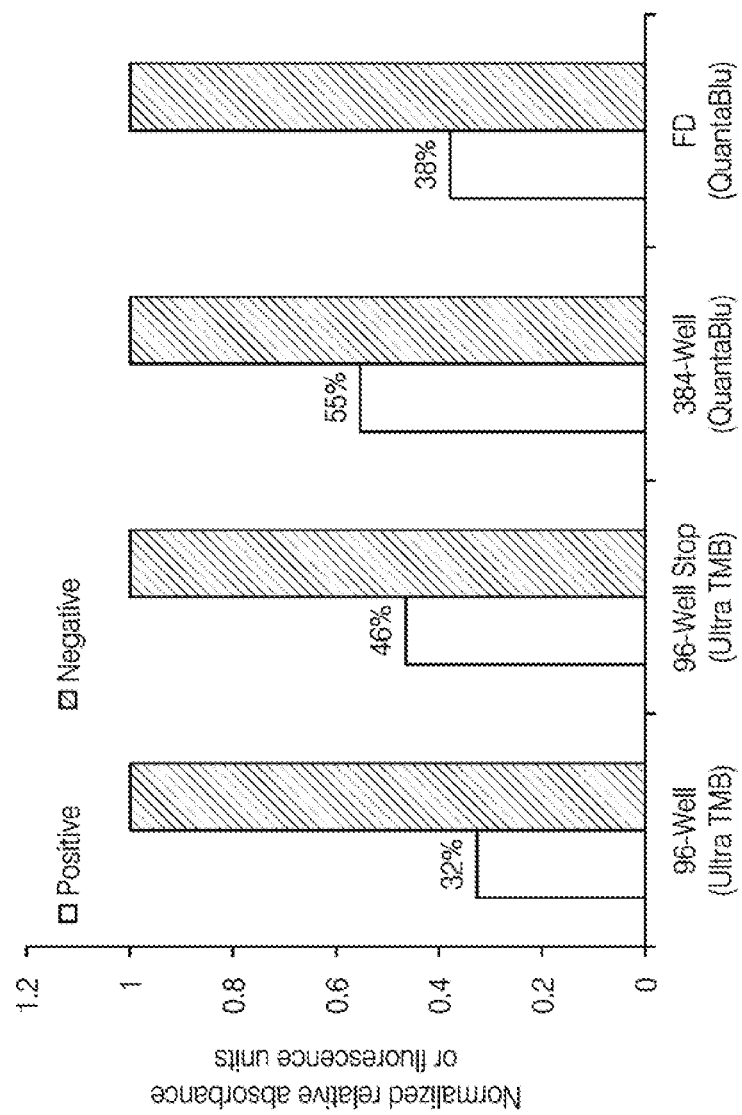

The immunoassay was successfully performed using the fluidic device of Example 1 (FIG. 4A). Moreover, the results obtained from the immunoassay conducted using the fluidic device were comparable to that of immunoassays performed in 96 well or 384 well plates (FIG. 4B).

Example 4

Storage of Multiple Fluids Without Cross-Contamination

A series of fluidic devices of Example 1 were connected as shown in FIG. 5. Different fluids can be added into the second port (7) of a series of fluidic devices by introducing a fluid plug followed by air, which pushes the fluid into the reaction wells for which the associated air control valve ports are open, thereby selectively filling reaction wells with the fluid. Filling of reaction wells can also be accomplished by introducing the fluid plug and aspirating it back into the fluid introduction device, e.g., a pipetting system such as pipette tip of manual/electronic/liquid-handling system or syringe pump tubing. Reaction wells with closed air control valve ports do not fill with the fluid.

Figure 6A:
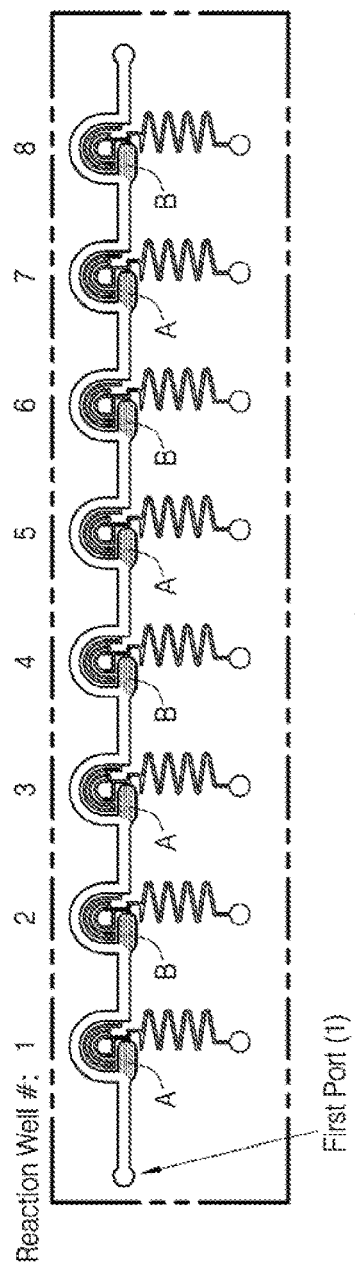
FIGS. 6A and 6B show schematic representations microscopic images of fluidic devices in a series (8 in FIG. 6A and 12 in FIG. 6B). Different fluids were stored in separate reactions wells without cross contamination by the opening and closing of air control valve ports upon fluid introduction.
Figure 6B:
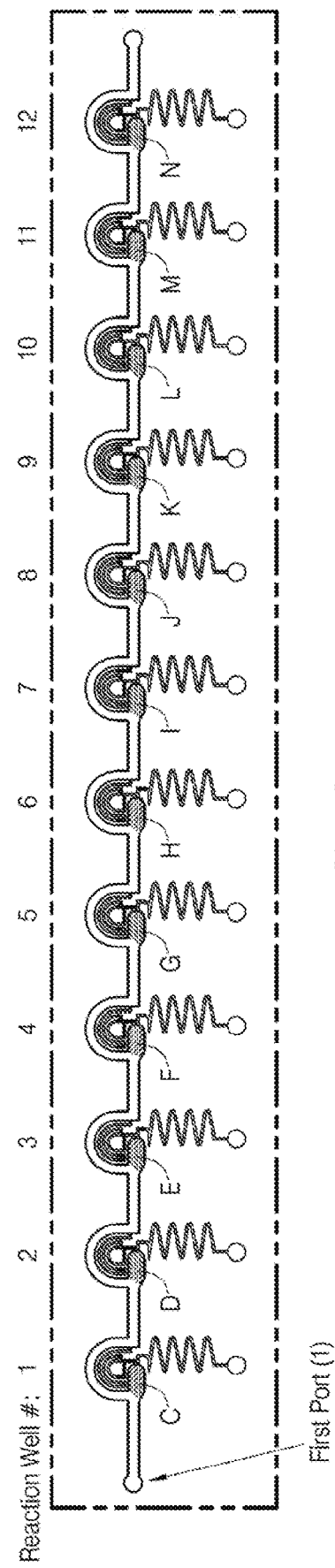

In this way, different fluids were introduced into a second port of a series of connected fluidic devices (FIGS. 6A and 6B). This was accomplished by opening air control valve port of the first reaction well (keeping those for reaction wells 2-8 closed) and introducing fluid A into the second port (7) followed by air or aspirating the fluid back into the fluid introduction device, causing the fluid A to enter reaction well 1 (and no other reaction wells) and then closing the air control valve port for that reaction well. The air control valve port of the second reaction well was then opened (keeping those of reaction wells 1 and 3-8 closed) and fluid B introduced into the second port of the second reaction well followed by passing air or aspirating the fluid back into the fluid introduction device, causing the fluid B to enter reaction well 2 (and no other reaction wells) and then closing the air control valve port for that reaction well. Reaction wells 3-8 were sequentially filled by using the same process for each respective reaction well. No mixing of fluids A and B was observed. While this example used only two types of fluids, a different fluid could be trapped in each respective well using this method.

This may also be accomplished, for example, by opening the air control valve ports for reaction wells 1, 3, 5 and 7, introducing fluid A can be introduced into the second port followed by passing air or aspirating the fluid back into the fluid introduction device, causing that fluid to enter reaction wells 1, 3, 5 and 7 but not reaction wells 2, 4, 6 and 8. The air control valve ports for reaction wells 1, 3, 5 and 7 can then be closed and the air control valve ports for reaction wells 2, 4, 6, and 8 opened. Fluid B can then be introduced into the second port followed by passing air or aspirating the fluid back into the fluid introduction device, thereby causing reaction wells 2, 4, 6, and 8 to fill with the fluid B. No mixing of fluids A and B would be observed.

In FIG. 6B, multiple fluidic plugs of different types (fluids C-N) were used to show the filling of specific reaction wells with certain fluids, with a lack of cross contamination between reaction wells, that was accomplished by the opening and closing of air control valve ports essentially as described above for the device shown in FIG. 6A.

The use of fluidics devices in a series (e.g., as exemplified in FIGS. 5 and 6) enables their use in point of care applications. Fluids or reagents can be preloaded into a cartridge (e.g. a hydrophobic tubing, pipette tip or cartridge) separated by air plugs to allow loading of any number of fluids into the reaction wells. For example, with immunoassays, a sample can be introduced into a common port, either the first port (1) or the second port (7), allowing it to be introduced into reaction wells, each coated with different antibodies.

Example 5

Operation of Exemplary Fluidic Devices

For a fluidic device manufactured with hydrophobic materials and having a port for an air control valve (1) a fluidic connection (2), a reaction well (3), a high resistance air valve constriction channel (4), an overflow channel (5), a second port (6), and a first port (7) (FIG. 7), fluid can be introduced into either the second port, the first port, or the air control valve port.

For example, in FIG. 8, a solution of fluorescence beads and water was introduced into the port of the air control valve (1) using a pipettor. The second port (6) was blocked (see FIG. 11). The fluid preferentially entered the reaction well instead of the high resistance air valve constriction channel (FIG. 8B). When air was subsequently introduced into the air control valve port (1), the surface tension of the liquid and air interface caused the air to bypass the reaction well (3) and pass through the high resistance air valve constriction channel (4) and into the overflow channel. Any excess fluid was forced out the first port (7) by the air (FIGS. 8C and 8D).

Example 6

Dilution or Washing Out of Fluid Held in an Exemplary Fluidic Device

A fluidic device disclosed in Example 5 was used to store a fluid (FIG. 9A). To dilute or wash out the fluid held in the fluidics device, a washing buffer was introduced into the port of the air control valve (FIG. 9A). The washing buffer coalesced (FIG. 9A and 9B) with the droplet in the reaction well and washed the fluid out of the reaction well, with the excess fluid leaving out the first port (7).

The first port, the second port, and the port of the air control valve each can be used as the fluid introduction port or for removal of excess fluid. Furthermore, by altering the flow rate and/or volume of the washing buffer, the droplet can be diluted or completely washed out of the reaction well.

Example 7

Connection of Fluidic Devices in Series

A series of fluidic devices of Example 5 can be connected as shown in FIG. 10. Different fluids can be added into the first port (1) of the series of fluidic devices by introducing a fluid plug followed by air to push the fluid into specific reaction wells. The fluid will only enter reaction wells for which the associated air control valves are open. In addition, a pipette can be programmed with preloaded reagents separated by air plugs to perform any number of steps of an immunoassay.

Example 8

Parallel Multiplexed Operations

The fluidic device presented in Example 5 (FIG. 7) can be connected in series with each having an additional port (FIG. 12). Fluidic operations can be as shown in previous Examples; however, overflow fluid can exit from the additional port following the terminal fluidic device subunit (8 in the eighth subunit in FIG. 12) without contaminating the other reaction wells that are connected in a series. Moreover, a single fluid plug can be passed through serially connected fluidic devices with the additional ports closed, allowing the fluid to enter all of the reaction wells, thereby enabling parallel multiplexed operations (FIG. 12). Since the nearest atmospheric exit or zero pressure is the sample port and geometrically the distance to the next port is larger, the fluid would typically exit through the port closest to the reaction well.

Example 9

Alternate Fluidic Device

Another fluidic device is illustrated in FIG. 13. This device comprises, in direct fluid connection with one another and in series: a first port (1); a first fluid transport channel (1A); a reaction well (2); an overflow channel (3); a fluidic connection channel (4); a second fluid transport channel (5A); and a second port (5). The device illustrated in FIG. 13 comprises many of the design features exhibited by the fluidic device portrayed in FIGS. 1A and 1B. The device in FIG. 13 has two ports available for fluid entry or exit (1 and 5). In the first step, fluid is initially loaded into the reaction well; this fluid must enter the device through the first port. Fluid passes from this port through the first fluid transport channel, where it begins to fill both the reaction well and the overflow channel, based in large part on the ratio of hydrodynamic resistance between these structures. Fluid completely fills the reaction well before the overflow channel is full. After the reaction well is full, fluid begins to enter the fluidic connection channel, while fluid in the overflow channel continues to advance. Fluid fills the connection channel and continues around the overflow channel until both fluid streams meet. Fluid then begins to enter the second fluid transport channel. At this point, first port (1); a first fluid transport channel (1A); a reaction well (2); an overflow channel (3); a fluidic connection channel (4); are each entirely full of fluid.

In the second step, in which fluid is trapped solely in the reaction well and the connection channel, negative pressure is applied from the first port. Fluid retreats from the second transport channel in a direction opposite to its loading direction. As fluid recedes to the junction between the fluid connection channel and the overflow channel, fluid passes solely through the overflow channel (fluid effectively "chooses" this channel). The smaller width of the fluid connection channel in comparison to the overflow channel produces a much stronger fluid-air interface, which prevents any fluidic recession through the connection channel or the reaction well. As fluid retreats around the overflow channel, it passes by the entrance to the reaction well and continues through the first fluid transport channel, leaving a fluid air interface at the opening of the reaction well. All excess fluid is removed from the first fluid transport channel and the first port, leaving fluid trapped only in the reaction well and fluid connection channel.

In the third step, to partially or fully replace the contents of the reaction well and fluid connection bridge with a new fluid, the second fluid port is used. Fluid enters through the second fluid port via applied pressure and continues through the second fluid transport channel. As fluid reaches the junction between the fluid connection channel and the overflow channel, fluid continues through both paths. Fluid begins to push the fluid housed in the fluid connection bridge and begins to pass around the overflow channel. This process continues; fluid continues to move around the overflow channel (e.g., "bridge") and continues to push fluid out of the fluid connection channel and the reaction well. Eventually, fluid from the overflow channel combines with fluid emerging from the opening of the reaction well. This combination of fluid continues through the first fluid transport channel and out of the first fluid port. At this point, the entire fluidic device is full of fluid. As more fluid is applied, the contents of the fluid connection bridge and reaction well are completely replaced by the new fluid. To "re-trap" this new fluid in the fluid connection bridge and reaction well, air is applied via positive pressure following the fluid from fluid port 2. Similar to the phenomena described earlier, this air forces fluid around the overflow channel as opposed to through the fluid connection channel and reaction well (due to the strong fluid-air interface at the opening of the fluid connection channel). Fluid is continually driven around the overflow channel and through the first fluid channel and removed via the first fluid port. This leaves the new fluid only trapped in the fluidic connection channel and the reaction well.

The optimal dimensions (width or diameter) and length for the various parts of the device illustrated in FIG. 13, when used in combination with one another, were determined for an illustrative embodiment. This height of this device ranged from 100 to 300 um and an optimal height determined to be be 300 um. The optimal width (diameter) and length of the first (1A) fluid transport channel was determined to include a tapering from the first port toward the overflow channel (3) of from 400 um (proximal to the first port) to 1600 um (distal from the first port and toward the reaction well (2) and the overflow channel). The optimal width (diameter) and length of the reaction well (2) was determined to be 800 um and 1000 um, respectively. The optimal width (diameter) and length of the overflow channel (3) was determined to be 945 um and 3185 um, respectively, when made of PDMS; and 790 um and 3065 um, respectively, when made of COC. The optimal width (diameter) and length of the fluidic connection channel (4) was determined to be 175 um and 140 um, respectively. And the optimal width (diameter) of the second (5A) fluid transport channel was determined to include a tapering from the overflow channel (3) and fluidic connection channel (4) toward the second port (5) of from 1240 um (proximal to the fluidic connection channel (4)) to 650 um (distal from the fluidic connection channel (4) and toward the second port (5)). The optimal length of the second (5A) fluid transport channel was determined to be 3350 um. As noted in the specification and claims, the relationships between these parts may also be expressed as a ratio, as would be understood by those of skill in the art from this example.

Optimal dimensions for the fluid connection channel (4) were also determined. This varied slightly depending on the material from which the fluid connection channel was prepared. A fluid connection channel (4) prepared from PDMS was found to have an optimal width (diameter) of from 150-225 um, and an ideal range of 175-200 um; and an optimal length of from 100-175 um, with an ideal range of 125-150 um. A fluid connection channel (4) prepared from COC was found to have an optimal width (diameter) of from 160-215 um; and an optimal length of 110-130 um.

The ratio of hydrodynamic resistance and capillary pressure within the fluid connection channel (4) and the the overflow channel (3) was also determined to be important to the proper function of the fluidic device. Capillary pressure in a hydrophobic channel (which includes all the materials we are using) serves as an opposing pressure or force to the flow of liquid. The higher this hydrophobic capillary pressure is, the more difficult it is to flow fluid through that channel (or the more pressure it takes to do so). In this case, the capillary pressure ratio between overflow channel (3) and fluid connection channel (4) is important. If overflow channel (3) has a very low capillary pressure compared to fluid connection channel (4), fluid will have much less opposing pressure when flowing through that path. This may lead to more fluid flow through overflow channel (3) as opposed to part 4, and slower fluid flow into fluid connection channel (4). If the flow into fluid connection channel (4) is too weak, the capillary pressure of fluid connection channel (4) may be strong enough to prevent fluid from completely filling that channel, leaving some air trapped in fluid connection channel (4). If air is trapped in fluid connection channel (4), the subsequent washing steps will either be significantly less effective or completely ineffective. The capillary pressure of fluid connection channel (4) must be low enough to allow this fluid in initially (as mentioned above), but must also be high enough to hold the fluid—air interface in the subsequent washing steps (e.g., fluid and air passed from serpentine mixing channel (5 in FIG. 14 described below). This is an important balance for the device to work correctly. A suitable range for the hydrodynamic resistance ratio of the fluid connection channel (4) and the the overflow channel (3) was determined to be about 0.13 to about 0.34 (ideally 0.185 to 0.254) when prepared using PDMS, or about 0.13 to about 0.21 when prepared using COC. A suitable range for the capillarly pressure ratio of the fluid connection channel (4) and the the overflow channel (3) was determined to be about 1.438 to about 1.726 (ideally 1.510 to 1.603) when prepared using PDMS, or about 1.426 to about 1.628 when prepared using COC.

FIG. 14 depicts a fluidic device embodiment that incorporates a downstream fluidic device (designated part 6, in FIG. 14) similar to that shown in FIG. 13 but lacking the second port in combination with an upstream fluidic mixer component. The fluidic mixer component is comprised of parts 1 (second port), 1A (fourth fluid transport channel), 2 (third port), 2A (fifth fluid transport channel), 3 (third fluid transport channel), 4 (mixing window, an optional feature), and 5 (serpentine mixing channel). Before fluid is introduced into the upstream fluidic mixer (parts 1-5), the downstream fluidic device (part 6) can be loaded with an initial fluid as described in the description of FIG. 13 above (i.e., steps 1 and 2). After loading of part 6, fluid may be introduced into the upstream fluidic mixer component. Fluid entry can occur in ports 1 or 2, and each respective fluid initially travels through the fourth and fifth fluid transport channels (1A and 2A, respectively). Fluids from the first and second transport channels then converge in the downstream (third) fluid transport channel (3). The initial fluid convergence in the beginning of the downstream fluid transport channel (i.e., near the junction of the fourth and fifth fluid transport channels (1A and 2A, respectively)) which marks the beginning of fluid mixing. As fluid continues through the third fluid transport channel part 3, it reaches the mixing "window" (4) when included in the device, where the interface between fluids can be visualized by the user. The fluid with a higher flow rate will occupy more of this mixing window than the fluid with the lower flow rate, with the ratio of window occupancy being directly related to the flow rate ratio between fluids.

After fluid passes through the third fluid transport channel (3) and/or mixing window (4), it reaches the serpentine mixing channel (5). This serpentine mixing channel is designed specifically to ensure complete fluidic mixing before the downstream fluidic device (6). Mixing in this channel relies primarily on diffusion; channel length and channel width are two of the major dimensional factors that influence this diffusion. The channel width and length of the serpentine mixing channel are selected to ensure complete fluid mixing for the desired fluid input settings.

After the fluid is mixed in the serpentine mixing channel, it flows into the downstream fluidic device (6). The incoming mixed fluid enters the downstream fluidic device (6) via the second fluid transport channel (part 5A from FIG. 13). At this point, incoming fluid will interact with the initial fluid in the downstream fluidic device (6) as described in Step 3 in the description of FIG. 13. Fluid mixed in the upstream fluidic mixer component will then flow through and replace the fluid initially loaded in downstream fluidic device (6).

With regards to fluid dispensed in ports 1 or 2 (FIG. 14), there are a variety of different input parameters. A single port may be used for a single fluid, leaving the other port unused, and the mixing device may simply serve as a transport channel to the downstream fluidic device (6). Two different fluids may also be used where, e.g., one fluid has a higher or lower flow rate compared to the other fluid. For instance, one fluid may be a concentrated drug solution, while the other fluid may be a buffering solution. By modifying the flow rates of each inputted solution, varying drug or sample concentrations may be achieved in the mixed solution.

The optimal dimensions (width or diameter) and length for the various parts of the device illustrated in FIG. 14, when used in combination with one another, were determined. This height of this device ranged from 100 to 300 um and an optimal height determined to be be 300 um. The width (diameter) and length of the fourth and fifth fluid transport channels used in this exemplary device was 500 um and 5340 um, respectively, but can be of any suitable width (diameter) and length which should be approximately the same. The width (diameter) and length of the overflow channel (3) used in this embodiment was determined to be 200 um and 4600 um, but can be of a longer or shorter length as the majority of the mixing function is provided by the serpentine mixing channel (5). The optimal width (diameter) and length of the serpentine mixing channel (5) was determined to be 400 um and 90.1 mm, respectively. The serpentine mixing channel (5) of the embodiment illustrated in FIG. 14 also included seven switchbacks with the length of between each being approximately equivalent. The dimensions of the downstream fluidic device (6) in this embodiment was essentially as described above for FIG. 13, except that the second port (7 in FIG. 13) was not included since the second fluid transport channel (5A of FIG. 13) is in fluidic connection with the serpentine mixing channel (5). As noted in the specification and claims, the relationships between these parts may also be expressed as a ratio, as would be understood by those of skill in the art from this example.

The device detailed in FIG. 14 allows for dynamic control of solution composition. As mentioned before, this solution may contain a drug, the concentration of which in solution may need to be adjusted in real time. Multiple input ports and control of input parameters allow for precise control of drug (or other substance) concentration, and the serpentine mixing channel ensures the drug (or other substance) is adequately mixed in the desired diluting solution. Independent loading ability provided by the inclusion of the downstream fluidic device (6), combined with the dynamic and real-time solution composition control provided by upstream fluidic mixer component (1-5 of FIG. 14), offers many benefits to the user. In one example, a cell population can be loaded into the reaction well of the downstream fluidic device (6). A drug solution of interest can be developed and mixed in the upstream fluidic mixer component, the concentration of which is adjustable by the user. Through a combination of the upstream fluidic mixer component and the downstream fluidic device, constant perfusion drug studies can be performed on cells, providing a much more tailored and realistic experience than standard static drug studies. The device pictured in FIG. 14 offers a dynamic cell study solution more closely related to in vivo situations than standard static cell studies.

While certain embodiments have been described in terms of the preferred embodiments, it is understood that variations and modifications will occur to those skilled in the art. Therefore, it is intended that the appended claims cover all such equivalent variations that come within the scope of the following claims.

What is claimed is:

1. A fluidic device comprising:
a first fluid transport channel;
a reaction well;
an overflow channel;
a fluidic connection;
an air control valve;
a port for the air control valve; and
a second fluid transport channel,
wherein:
the first fluid transport channel is in direct fluidic communication with the overflow channel and the reaction well;
the overflow channel is further in direct fluidic communication with the second fluid transport channel and the fluidic connection; and
the fluidic connection is further in direct fluidic communication with the reaction well and the air control valve.

2. The fluidic device of claim 1, wherein said air control valve has a serpentine shape.

3. A fluidic system comprising at least two fluidic devices of claim 1.

4. A fluidic device comprising:
an air control valve;
a fluidic connection;
a reaction well;
air valve constriction channel;
an overflow channel;
a first fluid transport channel; and
a second fluid transport channel,
wherein:
the first fluid transport channel is in direct fluidic communication with the overflow channel and the reaction well;
the overflow channel is further in direct fluidic communication with the reaction well, the air valve constriction channel, and the second fluid transport channel;
the reaction well is further in direct fluidic communication with the fluidic connection;
the fluidic connection is further in direct fluidic communication with the air valve constriction channel and the air control valve; and
the second fluid transport channel is further in direct fluidic communication with the air valve constriction channel.

5. The fluidic device of claim 4, further comprising an air control valve port connected to the air control valve.

6. A fluidic system comprising at least two fluidic devices of claim 5.

7. A fluidic system comprising:
a) a first fluid transport channel;
b) a second fluid transport channel;
c) a plurality of fluidic devices arranged in series, each fluidic device being positioned between the first fluid transport channel and the second fluid transport channel, wherein each fluidic device comprises:
a first intradevice fluid transport channel;
a reaction well;
an overflow channel;
a fluidic connection;
an air control valve;
a air valve constriction channel;
a port for the air control valve; and
a second intradevice fluid transport channel; and
d) a sample port and sample channel for at least one of the plurality of fluidic devices; wherein:
the first fluid transport channel is in direct fluidic communication with the sample channel and the first intradevice fluid transport channel of the first fluidic device;
the first intradevice fluid transport channel of each fluidic device is in direct fluidic communication with the reaction well and the overflow channel thereof;
the fluidic connection of each fluidic device is in direct fluidic communication with the reaction well, the air control valve, and the air valve constriction channel thereof;
the second intradevice fluid transport channel of each fluidic device is in direct fluidic communication with the overflow channel and the air valve constriction channel thereof;
the second intradevice fluid transport channel of each fluidic device is continuous with the first intradevice fluid transport channel of a subsequent fluidic device in the plurality of fluidic devices adjoined to one another and the first intradevice fluid transport channel and the second intradevice fluid transport channel are in direct fluidic communication with the sample channel; and
the second intradevice fluid transport channel of the last fluidic device in the series is continuous with the second fluid transport channel.

8. The fluidic system of claim 7, wherein at least one of said plurality of fluidic devices has an air control valve with a serpentine shape.

9. The fluidic device of claim 1, wherein the fluidic device is a microfluidic device and wherein the diameter of the fluidic connection is approximately 0.15 to approximately 0.30 times the diameter of the reaction well.

10. The fluidic device of claim 9, wherein the diameter of the fluidic connection is approximately 0.1-0.2 times the diameter of the second fluid transport channel at the point at which the fluidic connection and the second fluid transport channel contact one another and wherein the length of the fluidic connection is approximately 0.1-0.25 times the length of the reaction well.

11. The fluidic device of claim 4, wherein the fluidic device is a microfluidic device and wherein the diameter of the fluidic connection is approximately 0.15 to approximately 0.30 times the diameter of the reaction well.

12. The fluidic device of claim 11, wherein the diameter of the fluidic connection is approximately 0.1-0.2 times the diameter of the second fluid transport channel at the point at which the fluidic connection and the second fluid transport channel contact one another and wherein the length of the fluidic connection is approximately 0.1-0.25 times the length of the reaction well.

13. The fluidic device of claim 7, wherein each fluidic device of the plurality of fluidic devices is a microfluidic device and wherein the diameter of the fluidic connection of each fluidic device is approximately 0.15 to approximately 0.30 times the diameter of the reaction well.

14. The fluidic device of claim 13, wherein the diameter of the fluidic connection of each fluidic device is approximately 0.1-0.2 times the diameter of the second fluid transport channel at the point at which the fluidic connection and the second fluid transport channel contact one another and wherein the length of the fluidic connection of each fluidic device is approximately 0.1-0.25 times the length of the reaction well.

* * * * *